(12) United States Patent
Hoshino et al.

(10) Patent No.: US 8,942,277 B2
(45) Date of Patent: *Jan. 27, 2015

(54) WIRELESS COMMUNICATION APPARATUS AND WIRELESS COMMUNICATION METHOD

(71) Applicant: Panasonic Intellectual Property Corporation of America, Torrance, CA (US)

(72) Inventors: Masayuki Hoshino, Kanagawa (JP); Katsuhiko Hiramatsu, Kanagawa (JP); Yasuaki Yuda, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/933,892

(22) Filed: Jul. 2, 2013

(65) Prior Publication Data

US 2013/0294251 A1 Nov. 7, 2013

Related U.S. Application Data

(63) Continuation of application No. 12/920,447, filed as application No. PCT/JP2009/001078 on Mar. 10, 2009, now Pat. No. 8,532,164.

(30) Foreign Application Priority Data

Mar. 12, 2008 (JP) ................................. 2008-062680

(51) Int. Cl.
*H04B 1/38* (2006.01)
*H04W 28/12* (2009.01)
(Continued)

(52) U.S. Cl.
CPC ............. *H04W 28/12* (2013.01); *H04L 1/0001* (2013.01); *H04L 1/1819* (2013.01); *H04L 1/1887* (2013.01); *H04L 1/1896* (2013.01); *H04W 28/18* (2013.01)
USPC ........... 375/220; 375/224; 375/225; 375/316; 375/340; 370/236; 370/334; 370/342

(58) Field of Classification Search
CPC ...................................................... H04W 28/12
USPC .......... 375/220, 224, 225, 316, 340; 370/236, 370/334, 342
See application file for complete search history.

(56) References Cited

U.S. PATENT DOCUMENTS 7,301,929 B2 11/2007 Frederiksen
7,835,337 B2 11/2010 Kim
(Continued)

FOREIGN PATENT DOCUMENTS

CN 1472973 2/2004
EP 1 624 606 2/2006
(Continued)

OTHER PUBLICATIONS

3GPP TSG Geran #35, "Hybrid ARQ Signaling for Circular Buffer Rate Matching," Motorola, Tdoc GP-071184, Dublin, Ireland, Aug. 27-31, 2007, pp. 1-11.

(Continued)

*Primary Examiner* — Leon Flores
(74) *Attorney, Agent, or Firm* — Dickinson Wright PLLC

(57) ABSTRACT

To improve throughput by reducing the resource used for transmitting a parameter relating to retransmission control and decreasing overhead of retransmission control signaling. Where a retransmission control method is employed with adaptive MCS control in which the encoding rate can be changed, the scheduling section sets the MCS in accordance with CQI notified from the communication counterpart apparatus. When transmission data is encoded, the RV parameter bit-number setting section sets the number of bits used for signaling the RV parameter to decrease as the encoding rate of the first transmission is decreased and sets the RV parameter based on the number of bits. For example, in a case where the encoding rate R is R>$\frac{2}{3}$, two bits are set. In a case where the encoding rate $\frac{1}{3}$<R≤$\frac{2}{3}$, one bit is set. On the other hand, in a case where R≤$\frac{1}{3}$, zero bits is set.

16 Claims, 17 Drawing Sheets

(51) Int. Cl.
*H04L 1/00* (2006.01)
*H04L 1/18* (2006.01)
*H04W 28/18* (2009.01)

(56) References Cited

U.S. PATENT DOCUMENTS

| | | |
|---|---|---|
| 7,890,834 B2 | 2/2011 | Blankenship |
| 8,208,363 B2 | 6/2012 | Kishiyama |
| 8,265,023 B2 | 9/2012 | Wang |
| 2004/0047321 A1 | 3/2004 | Bui |
| 2005/0076283 A1 | 4/2005 | Malkamaki |
| 2005/0288492 A1 | 12/2005 | Rabbitts |
| 2006/0190796 A1 | 8/2006 | Hagiwara |
| 2007/0133579 A1 | 6/2007 | Kim |
| 2007/0150787 A1 | 6/2007 | Kim |
| 2007/0255994 A1 | 11/2007 | Michel |
| 2009/0125774 A1 | 5/2009 | Kim |
| 2011/0161766 A1 | 6/2011 | Malkamaki |

FOREIGN PATENT DOCUMENTS

| | | |
|---|---|---|
| EP | 1 796 303 | 6/2007 |
| EP | 1 865 642 | 12/2007 |
| JP | 2005-80115 | 3/2005 |
| JP | 2006-521088 | 9/2006 |
| JP | 2007-507954 | 3/2007 |
| WO | 2006/109436 | 10/2006 |

OTHER PUBLICATIONS

Extended European Search Report dated Mar. 27, 2014.
K. Balachandran, et al., "A Proposal for EGPRS Radio Link Control Using Link Adaptation and Incremental Redundancy," Bell Labs Technical Journal, P-000878195, Jul.-Sep. 1999, pp. 19-36.
3GPP TSG RAN WG1 Meeting #51, "Redundancy Version Definition for turbo code rate matching," Samsung, R1-074794, Jeju, Korea, Nov. 5-9, 2007, pp. 1-2.
International Search Report dated May 19, 2009.
D. Mandelbaum, "An Adaptive-Feedback Coding Scheme Using Incremental Redundancy," IEEE Transactions on Information Theory, May 1974, pp. 388-389.
3GPP TSG-RAN WG1 RAN1#49, "Way forward on HARQ rate matching for LTE," Ericcson, R1-072604, May 2007, pp. 1-6.
3GPP TSG RAN1 #51bis, "PDCCH Scheduling Assignment Field Definition (MCS, RV, NDI)," Motorola, R1-080436, Sevilla, Spain, Jan. 14-18, 2008, pp. 1-6.
3GPP TSG-Ran WG1 Meeting #52, "Joint Transport Format and Redundancy Version signaling with explicit NDI," Panasonic, NTT DoCoMo, R1-080973, Sorrento, Italy, Feb. 11-15, 2008, pp. 1-4.

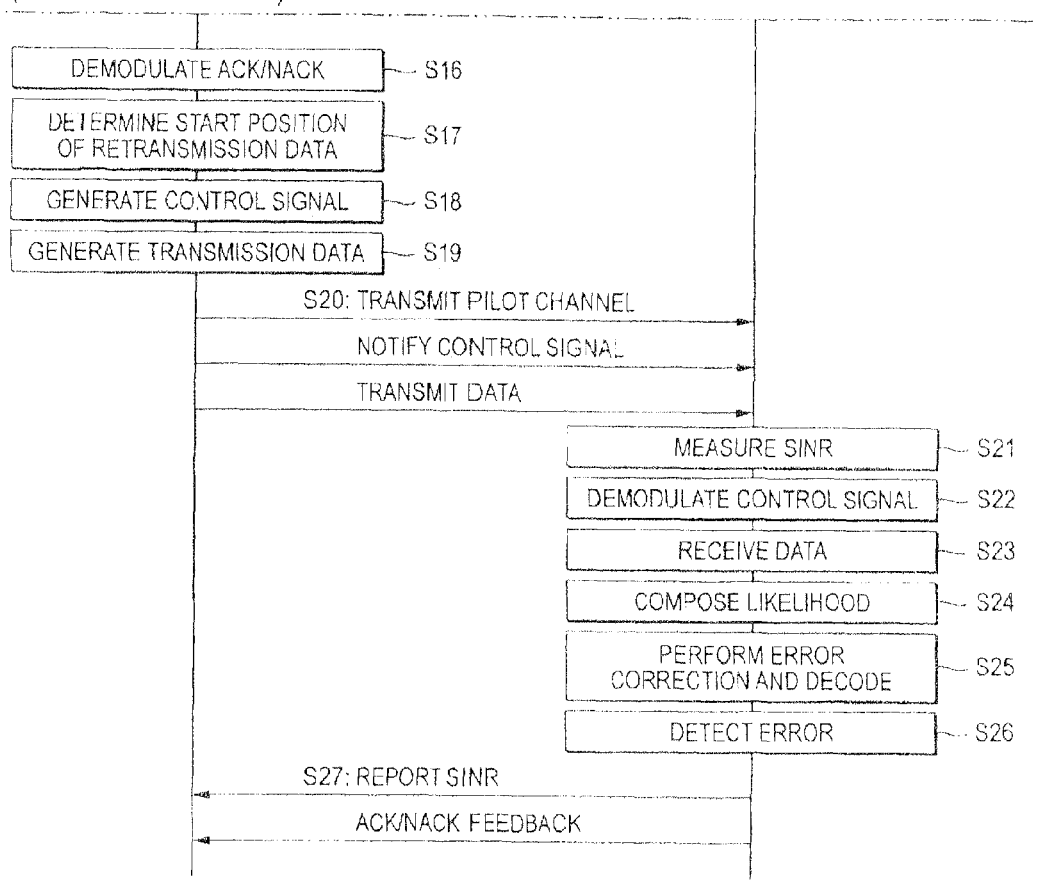

FIG. 6

| ENCODING RATE | NUMBER OF BITS FOR RV PARAMETER |
|---|---|
| $2/3 < R$ | 2 |
| $1/3 < R \leq 2/3$ | 1 |
| $R \leq 1/3$ | 0 |

FIG. 11

|  | CODE WORD | ENCODING RATE | NUMBER OF BITS FOR RV PARAMETER |
|---|---|---|---|
| EXAMPLE 1 | CW1 | 0.75 | 4 |
| | CW2 | 0.33 | 1 |
| | CW3 | 0.50 | 2 |
| EXAMPLE 2 | CW1 | 0.80 | 4 |
| | CW2 | 0.75 | 2 |
| | CW3 | 0.50 | 1 |

WIRELESS COMMUNICATION APPARATUS AND WIRELESS COMMUNICATION METHOD

CROSS REFERENCE TO RELATED APPLICATIONS

This is a continuation application of application Ser. No. 12/920,447 filed Aug. 31, 2010, which is a 371 application of PCT/JP2009/001078 filed Mar. 10, 2009, which is based on Japanese Application No. 2008-062,680 filed Mar. 12, 2008, the entire contents of each of which are incorporated by reference herein.

TECHNICAL FIELD

The present invention relates to a wireless communication apparatus that can be applied to a wireless communication system such as a cellular system, and more particularly, to a wireless communication apparatus, a wireless communication system, and a wireless communication method that have a retransmission control function.

BACKGROUND ART

Recently, in wireless communication, a retransmission control method that combines propagation path encoding and retransmission composition has called attention as a system implementing high-speed transmission by effectively using the limited frequency band. As a combination of the propagation path encoding and the retransmission composition in a retransmission control method, a combination of a turbo code for which a flexible encoding rate can be set with puncture and an IR (incremental redundancy) method in which a punctured parity bit is slightly added each time when a retransmission occurs is effective. Such a retransmission control method is precisely referred to as Hybrid ARQ (HARQ). However, hereinafter, such a retransmission control method is described simply as "retransmission control".

In Non Patent Citation 1, as an error correction method using adaptive feedback, technology for improving the error correction capability by using the IR is disclosed. In addition, in 3GPP-LTE (3rd Generation Partnership Project Long Term Evolution) that is a specification of the next cellular system, in order to simplify the definition of retransmission data such as the redundancy version (hereinafter, referred to as RV), CBRM (Circular Buffer based Rate-Matching) is reviewed (see Non Patent Citation 2). The CBRM is a rate matching method in which the RV is defined by sequentially reading out a turbo code accumulated in a circular buffer that is a sequential read-type buffer from any arbitrary start position in order of the buffer address.

An example of the operation of the retransmission control that combines propagation path coding and the retransmission composition will be briefly described with reference to FIG. 15. FIG. 15 is a diagram representing a concrete example of the relationship between transmission data and RV parameter settings in the retransmission control and shows the image of an IR buffer in a case where the encoding rate R=⅚. In the retransmission control using the IR, an RV parameter that represents the start position of the retransmission data for retransmission is set. Thus, on the transmission side, the data from the start position that is designated by the RV parameter is transmitted as the retransmission data, and the receiver side and the reception side is notified of this RV parameter.

When the transmission data is generated on the transmission side, turbo encoding is performed for systematic bits (denoted by S in the figure) in which information to be transmitted is included so as to generate parity bits (in the figure, denoted by P), and the encoded data is stored in the IR buffer. A puncture process is performed for the parity bits of the encoded data inside the IR buffer with a uniform rule, and a part of the encoded data is extracted and transmitted. At the first transmission, the left end in the figure inside the IR buffer is set as the data start position.

FIG. 15 represents a configuration example in which an RV parameter is represented by 2 bits, and a total of four data start positions (in the figure, denoted by white circles) are arranged. In such a case, at the first transmission. RV=0, a part of the systematic bits S and the parity bits P is transmitted from the start position by using all the number of bits that can be transmitted by using predetermined physical resources. Here, the remaining data out of the encoded data inside the IR buffer is handled as untransmitted data. When an Nack signal is fed back from the reception side, and retransmission is to be performed, RV is set as RV=2 as the second transmission data, and data inside the IR buffer is extracted from the third start position from the left side, and a signal is transmitted by using the same number of bits as that of the first transmission. Thereafter, at the third transmission. RV is set as RV=1, at the fourth transmission RV is set as RV=3, and as shown in FIG. 15, data inside the IR buffer is extracted from a respective start position and is transmitted.

In a wireless communication system such as a cellular system, adaptive MCS (Modulation and Coding Scheme) control in which a modulation type and an encoding rate are adaptively changed in accordance with the reception quality is reviewed. In the adaptive MCS control, the encoding rate is changed by puncture or repetition of a bit row after encoding.

[Non Patent Citation 1] David M. Mandelbaum, "An adaptive-feedback coding scheme using incremental redundancy", Information Theory, IEEE Transactions on, May 1974, P. 388-389

[Non Patent Citation 2] R1-072604, "Way forward on HARQ rate matching for LTE", Ericsson, et al., 3 GPP TSG-RAN WG1 RAN1#49, 2007/05

SUMMARY

Technical Problem

By introducing the adaptive MCS control or retransmission control, an advantage of improving the throughput can be acquired by flexibly setting parameters in accordance with the state of the propagation path. However, in retransmission control signaling for applying the adaptive MCS control, data having a high encoding rate is effectively used, and an RV parameter needs to be set so as to represent a plurality of data time points. Accordingly, there is a problem that the RV parameter setting cannot effectively used for data having a low encoding rate.

FIG. 16 is diagram representing a concrete example of the relationship between transmission data and RV parameter setting in the retransmission control in a case where the encoding rate is changed. (a) is an IR buffer image for a case where the encoding rate R=⅚, and (b) is an IR buffer image for a case where the encoding rate R=¼.

As in FIG. 16(a), in a case where the encoding rate is high as R=⅚, in order to effectively utilize a parity bit that is untransmitted at the first transmission through the puncture process, RV parameter setting of about two bits is necessary. On the other hand, as shown in FIG. 16(b), in a case where the encoding rate is low as R=¼, repetition of the parity bit is performed at the first transmission, and all encoded data is transmitted. Accordingly, when the RV parameter setting for a high encoding rate is directly applied to data having a low encoding rate, the same data is repeatedly transmitted without depending on the arranged two bits of the RV parameter. Therefore, the situation is the same as setting RV=0 every time. Accordingly, the resource of the RV parameter is useless, and there is a problem in that the throughput decreases.

The present invention is contrived in consideration of the above-described situations. The object of the present invention is to provide a wireless communication apparatus, a wireless communication system, and a wireless communication method capable of improving the throughput by reducing the resource used for transmission of a parameter relating to the retransmission control and decreasing the signaling overhead for retransmission control.

Technical Solution

According to a first aspect of the present invention, there is provided a wireless communication apparatus including: a propagation path quality acquiring section that receives a measurement result of a propagation path quality from a communication counterpart apparatus; an MCS setting section that sets an MCS (Modulation and Coding Scheme) including an encoding rate in accordance with the measurement result of the propagation path quality; an encoding section that encodes transmission data in accordance with the MCS; a retransmission control section that controls retransmission of transmitted data based on a response signal transmitted from the communication counterpart apparatus; a parameter bit-number setting section that sets the number of bits of a retransmission control parameter in accordance with the encoding rate of a first transmission so as to decrease the number of bits of the retransmission control parameter as the encoding rate is smaller; a retransmission control parameter setting section that sets the retransmission control parameter by using the set number of bits; a control signal generating section that generates a control signal having control information including the MCS and the retransmission control parameter; and a transmission processing section that transmits to the communication counterpart apparatus the control signal and the encoded data.

Accordingly, in a case where the encoding rate is low, and the granularity of control of the retransmission control parameter is allowed to be rough, by decreasing the number of bits of the retransmission control parameter, the resource used for transmitting the parameter relating to the retransmission control can be reduced. Therefore, the throughput can be improved by decreasing the overhead of retransmission control signaling.

According to a second aspect of the present invention, there is provided the above-described wireless communication apparatus, wherein the parameter bit-number setting section, in a case where the encoding rate of the first transmission is equal to or lower than a predetermined value, sets the number of bits of the retransmission control parameter to be smaller than that in a case where the encoding rate is equal to or higher than the predetermined value.

According to a third aspect of the present invention, there is provided the above-described wireless communication apparatus, wherein the parameter bit-number setting section sets the number of bits of the retransmission control parameter to zero bits in a case where the encoding rate of the first transmission is equal to or lower than a predetermined value.

According to a fourth aspect of the present invention, there is provided the above-described wireless communication apparatus, wherein the wireless communication apparatus performs communication by using a plurality of code words, wherein the MCS setting section sets the MCS for each of the plurality of code words, and wherein the parameter bit-number setting section sets the number of the bits of the retransmission control parameter to be smaller for the code word having a smaller encoding rate of the first transmission out of the plurality of code words.

Accordingly, while retransmission control can be flexibly set for a code word that has a high encoding rate of the first transmission and has much untransmitted data, the resource used for transmission of the retransmission control parameter can be reduced for a code word that is not influenced much by decreasing the degree of freedom of the retransmission control parameter. Therefore, the throughput can be improved by decreasing the overhead of retransmission control signaling for a plurality of code words.

According to a fifth aspect of the present invention, there is provided the above-described wireless communication apparatus, wherein the parameter bit-number setting section, while maintaining a total number of bits of the retransmission control parameters to be constant, adjusts the numbers of bits between the plurality of code words and sets the number of bits of the code word having a lower encoding rate of the first transmission to be smaller.

According to a sixth aspect of the present invention, there is provided the above-described wireless communication apparatus, wherein the parameter bit-number setting section sets the number of bits of the code word having the encoding rate of the first transmission that is equal to or lower than a predetermined value to zero bits.

According to a seventh aspect of the present invention, there is provided the above-described wireless communication apparatus, wherein the wireless communication apparatus performs communication by using a plurality of streams for a plurality of code words. In addition, the wireless communication apparatus further includes a stream-number setting section that sets the number of streams for each of the plurality of code words, wherein the parameter bit-number setting section sets the number of bits of the retransmission control parameter to be smaller for the code word having a smaller number of streams of the first transmission out of the plurality of code words.

Accordingly, while the retransmission control can be flexibly set for a code word having the number of streams of the first transmission to be high, the resource used for transmitting the retransmission control parameter can be reduced for a code word that may transmit the untransmitted data much more with high possibility by increasing the number of streams at the time of retransmission. Therefore, the throughput can be improved by decreasing the overhead of retransmission control signaling for a plurality of code words.

According to an eighth aspect of the present invention, there is provided the above-described wireless communication apparatus, wherein the parameter bit-number setting section, while maintaining a total number of bits of the retransmission control parameter to be constant, adjusts the numbers of bits between the plurality of code words and sets the number of bits of the code word having a smaller number of streams of the first transmission to be smaller.

According to a ninth aspect of the present invention, there is provided the above-described wireless communication apparatus, wherein the parameter bit-number setting section sets the number of bits of the code word having the number of streams of the first transmission equal to or smaller than a predetermined value to zero bits.

According to a tenth aspect of the present invention, there is provided a wireless communication apparatus including: a propagation path quality notifying section that measures a propagation path quality between a communication counterpart apparatus and the wireless communication apparatus and notifies of a measurement result of the propagation path quality; a reception processing section that receives a control signal and data from the communication counterpart apparatus; a control information storing section that acquires an MCS including an encoding rate from control information included in the control signal and stores information on the encoding rate of a first transmission; a retransmission control parameter demodulating section that identifies the number of bits of a retransmission control parameter that is set in accordance with the encoding rate of the first transmission and demodulates the retransmission control parameter included in the control information; and a decoding section that decodes received data based on the retransmission control parameter.

Accordingly, by decreasing the number of bits of the retransmission control parameter in a case where the encoding rate is low, the resource used for transmitting the parameter relating to the retransmission control can be reduced, and the overhead of retransmission control signaling can be decreased. Therefore, the throughput can be improved. On the reception side, the retransmission control parameter can be accurately identified, and decoding or the like can be performed at the time of retransmission.

According to an eleventh aspect of the present invention, there is provided the above-described wireless communication apparatus, wherein the wireless communication apparatus performs communication by using a plurality of code words, wherein the control information storing section stores control information for each of the plurality of code words, and wherein the retransmission control parameter demodulation section identifies the number of bits of the retransmission control parameter that is set in accordance with the encoding rate of the first transmission from the plurality of code words and demodulates the retransmission control parameter.

Accordingly, for a code word that has a low encoding rate and is not influenced much by decreasing the degree of freedom of the retransmission control parameter, the resource used for transmitting the retransmission control parameter can be reduced, and the overhead of retransmission control signaling for a plurality of code words can be decreased. Therefore, the throughput can be improved. On the reception side, the retransmission control parameter can be accurately identified, and decoding or the like can be performed at the time of retransmission of each code word.

According to a twelfth aspect of the present invention, there is provided the above-described wireless communication apparatus, wherein the wireless communication apparatus performs communication by using a plurality of streams for a plurality of code words, wherein the control information storing section stores control information for each of the plurality of code words, and wherein the retransmission control parameter demodulating section identifies the number of bits of the retransmission control parameter set in accordance with the number of streams of the first transmission from the plurality of code words and demodulates the retransmission control parameter.

Accordingly, for a code word that has a small number of streams of the first transmission and may transmit untransmitted data much more with high possibility by increasing the number of streams at the time of retransmission, the resource used for transmitting the retransmission control parameter can be reduced, and the overhead of retransmission control signaling of a plurality of code words can be decreased. Therefore, the throughput can be improved. On the reception side, the retransmission control parameter can be accurately identified, and decoding or the like can be performed for each code word at the time of retransmission.

According to a thirteenth aspect of the present invention, there is provided a wireless communication base station apparatus including any of the above-described the wireless communication apparatus.

According to a fourteenth aspect of the present invention, there is provided a wireless communication mobile station apparatus including any of the above described the wireless communication apparatus.

According to a fifteenth aspect of the present invention, there is provided a wireless communication system including: a transmission apparatus including a propagation path quality acquiring section that receives a measurement result of a propagation path quality from a receiver apparatus as a communication counterpart apparatus, an MCS setting section that sets an MCS including an encoding rate in accordance with the measurement result of the propagation path quality, an encoding section that encodes transmission data in accordance with the MCS, a retransmission control section that controls retransmission of transmitted data based on a response signal transmitted from the receiver apparatus, a parameter bit-number setting section that sets the number of bits of a retransmission control parameter in accordance with the encoding rate of a first transmission to so as to decrease the number of bits as the encoding rate is smaller, a retransmission control parameter setting section that sets the retransmission control parameter by using the set number of bits, a control signal generating section that generates a control signal having control information including the MCS and the retransmission control parameter, and a transmission processing section that transmits to the receiver apparatus the control signal and the encoded data; and the receiver apparatus including a propagation path quality notifying section that measures the propagation path quality between the transmission apparatus and the wireless communication apparatus and notifies of the measurement result of the propagation path quality, a reception processing section that receives the control signal and the data from the transmission apparatus, a control information storing section that acquires an MCS including an encoding rate from the control information included in the control signal and stores information on the encoding rate of the first transmission, a retransmission control parameter demodulating section that identifies the number of bits of the retransmission control parameter that is set in accordance with the encoding rate of the first transmission and demodulates the retransmission control parameter included in the control information, and a decoding section that decodes received data based on the retransmission control parameter.

According to a sixteenth aspect of the present invention, there is provided a wireless communication method including: receiving a measurement result of a propagation path quality from a communication counterpart apparatus; setting an MCS including an encoding rate in accordance with the measurement result of the propagation path quality; encoding transmission data in accordance with the MCS; controlling retransmission of transmitted data based on a response signal transmitted from the communication counterpart apparatus; setting the number of bits of a retransmission control parameter in accordance with the encoding rate of a first transmission so as to decrease the number of bits as the encoding rate is smaller; setting the retransmission control parameter by using the set number of bits; generating a control signal having control information including the MCS and the retransmission control parameter; and transmitting to the communication counterpart apparatus the control signal and the encoded data.

According to a seventeenth aspect of the present invention, there is provided a wireless communication method including: measuring a propagation path quality between a communication counterpart apparatus and the wireless communication apparatus and notifying of a measurement result of the propagation path quality; receiving a control signal and data from the communication counterpart apparatus; acquiring an MCS including an encoding rate from control information included in the control signal and storing information on the encoding rate of a first transmission; identifying the number of bits of a retransmission control parameter that is set in accordance with the encoding rate of the first transmission and demodulating the retransmission control parameter included in the control information; and decoding received data based on the retransmission control parameter.

Advantageous Effects

According to the present invention, there are provided a wireless communication apparatus, a wireless communication system, and a wireless communication method capable of improving the throughput by reducing the resource used for transmitting a retransmission control parameter and decreasing the overhead of retransmission control signaling.

BRIEF DESCRIPTION OF DRAWINGS

FIG. 6 is a diagram representing an example of setting the number of bits of a RV parameter corresponding to an encoding rate, according to the first embodiment.

FIG. 11 is a diagram representing examples of setting the number of bits of the RV parameter according to a decoding rate, according to the second embodiment.

EXPLANATION OF REFERENCE CHARACTERS

101: WIRELESS BASE STATION
102: USER EQUIPMENT
311, 911: ENCODING UNIT
312, 912: RATE MATCHING UNIT
313: RV PARAMETER BIT-NUMBER SETTING UNIT
314, 914: CONTROL SIGNAL GENERATING UNIT
315: MULTIPLEXING UNIT
316, 916a, 916b: TRANSMISSION RF UNIT
317, 917a, 916b: ANTENNA
318, 918: RECEPTION RF UNIT
319, 919: SEPARATION UNIT
320, 920: DEMODULATING AND DECODING UNIT
321, 921: CRC TEST UNIT
322, 922: Ack/Nack SIGNAL ADJUSTING UNIT
323, 923: CQI DEMODULATING UNIT
324, 924, 1301: SCHEDULING UNIT
431, 1031a, 1031b: ANTENNA
432, 1032a, 1032b: RECEPTION RF UNIT
433, 1033: CHANNEL ESTIMATING UNIT
434, 1034: CONTROL SIGNAL DEMODULATING UNIT
435: DEMODULATING UNIT
436, 1036: DECODING UNIT
437, 1037, 1401: RV PARAMETER IDENTIFYING UNIT
438, 1038: FIRST-RIME MCS CONSERVATION UNIT
439, 1039: LIKELIHOOD CONSERVATION UNIT
440, 1040: CRC TEST UNIT
441, 1041: SINR MEASURING UNIT
442, 1042: FEEDBACK INFORMATION GENERATING UNIT
443, 1043: Ack/Nack GENERATING UNIT
444, 1045: ENCODING UNIT
445, 1045: MULTIPLEXING UNIT
446, 1046: TRANSMISSION RF UNIT
913, 1302: INTER-CODE WORD RV PARAMETER BIT-NUMBER ADJUSTING UNIT
915: MIMO MULTIPLEXING UNIT
925, 1303: RV PARAMETER BIT-NUMBER CONSERVATION UNIT FOR EACH CODE WORD
1035: MIMO DEMODULATING UNIT
1402: FIRST-TIME STREAM-NUMBER CONSERVATION UNIT

DETAILED DESCRIPTION OF EMBODIMENTS

In this embodiment, an example in which a wireless communication apparatus, a wireless communication system, and a wireless communication method according to the present invention are applied to a mobile communication cellular system such as a cellular phone is represented. Here, a case where, in a wireless communication system in which a wireless base station (BS) is a transmission apparatus, and a user equipment (UE) of a mobile station is a receiver apparatus, retransmission control (HARQ) combining propagation path coding using a turbo code and IR-mode retransmission composition is performed will be described as an example. A method of setting an RV parameter, as a retransmission control parameter relating to retransmission control, that represents a start position of retransmission data in the IR mode will be described.

First Embodiment

Figure 1:
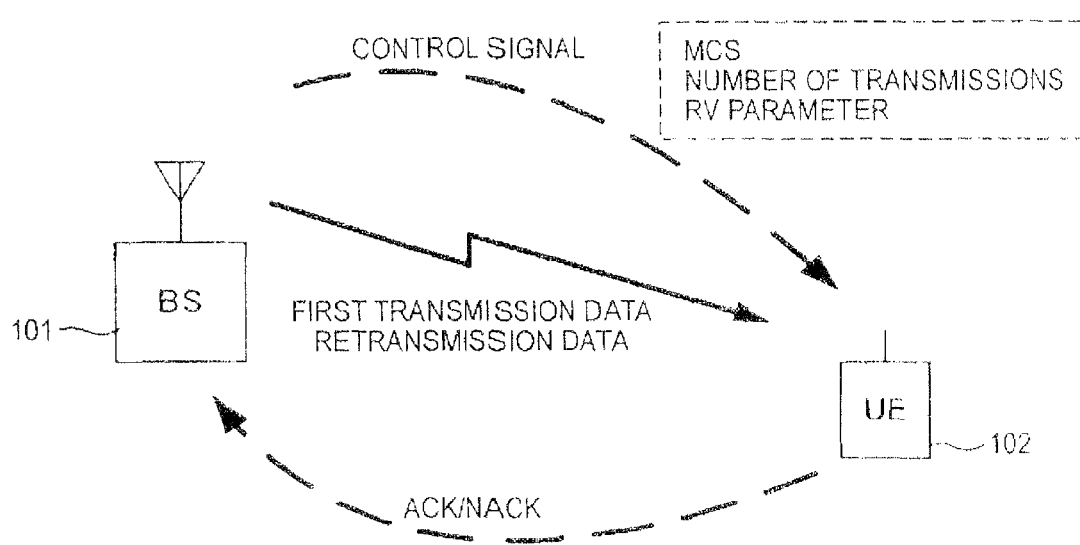
FIG. 1 is a diagram schematically representing signal transmission in a communication system according to an embodiment of the present invention.

FIG. 1 is a diagram schematically representing signal transmission in a communication system according to an embodiment of the present invention. A wireless base station 101 that becomes the transmission apparatus transmits data to a user equipment 102 that becomes the receiver apparatus. The user equipment 102 replies with Ack (Acknowledgement) or Nack (Negative Acknowledgement) as a response signal based on the result of decoding the received data. In a case where a Nack response signal is received for first transmission data or retransmission data from the user equipment 102, the wireless base station 101 performs retransmission by transmitting the next retransmission data. At this time, the wireless base station 101 transmits data at a different start position out of coded data, which is acquired by adding a parity bit to systematic bits, at the time of retransmission, and thereby acquiring the advantage of retransmission and composition by employing the IR mode. The wireless base station 101 notifies the user equipment 102 of a signal having information that includes an MCS and the number of transmissions as a control signal, an RV parameter and the like as a retransmission control parameter. The user equipment 102 composes and decodes the retransmission data by using the information of the control signal transmitted from the wireless base station 101.

Figure 2:
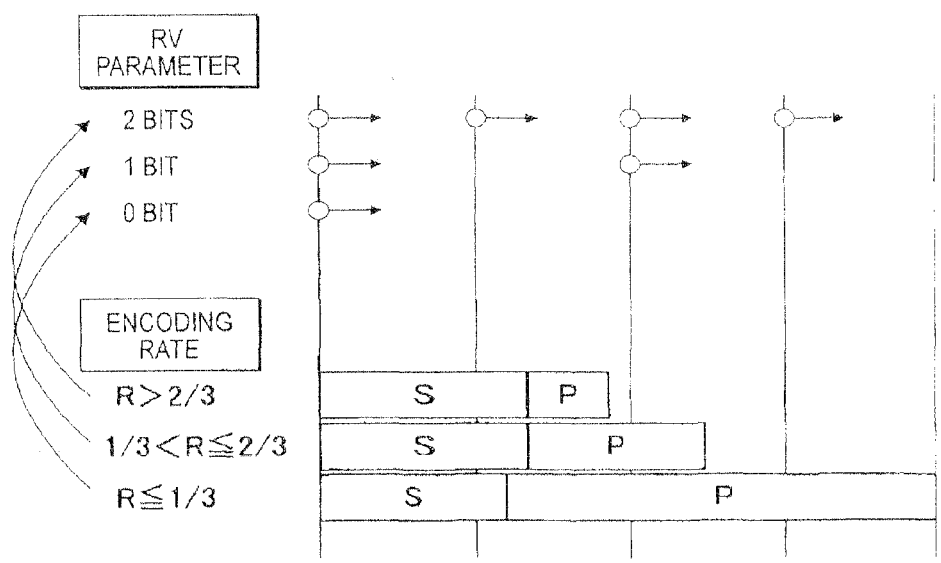
FIG. 2 is a diagram schematically representing a setting example of the RV parameter according to a first embodiment of the present invention.

FIG. 2 is a diagram schematically representing a setting example of the RV parameter according to a first embodiment of the present invention and shows the image of an IR buffer. In the first embodiment, in a case where a retransmission control method is employed in consideration of adaptive MCS control in which the encoding rate can be changed, as the encoding rate of the first transmission becomes lower, the number of bits of the RV parameter that is used for signaling is further decreased.

For example, as represented in the setting example of FIG. 1, in a case where the encoding rate R is high as R>⅔, the number of bits of the RV parameter is set to two bits. In addition, in a case where the encoding rate R is ⅓<R≤⅔, the number of bits of the RV parameter is set to one bit. In a case where the encoding rate R is low as R≤⅓, the number of bits of the RV parameter is set to zero bit.

As described above, by setting the number of bits of the RV parameter to be decreased as the encoding rate of the first transmission is decreased, the waste of resources for the RV parameter can be prevented for data having a low encoding rate. In other words, in a case where the encoding rate is low, and the granularity of control of the RV parameter is allowed to be rough, the overhead of the RV parameter signaling can be lowered. As a result, when adaptive MCS control and retransmission control are applied, the throughput can be improved by decreasing the overhead of the retransmission control signaling. Accordingly, the retransmission control can be implemented to have excellent characteristics.

Next, concrete configurations of the transmission apparatus and the receiver apparatus of the wireless communication system according to the first embodiment will be described.

Figure 3:
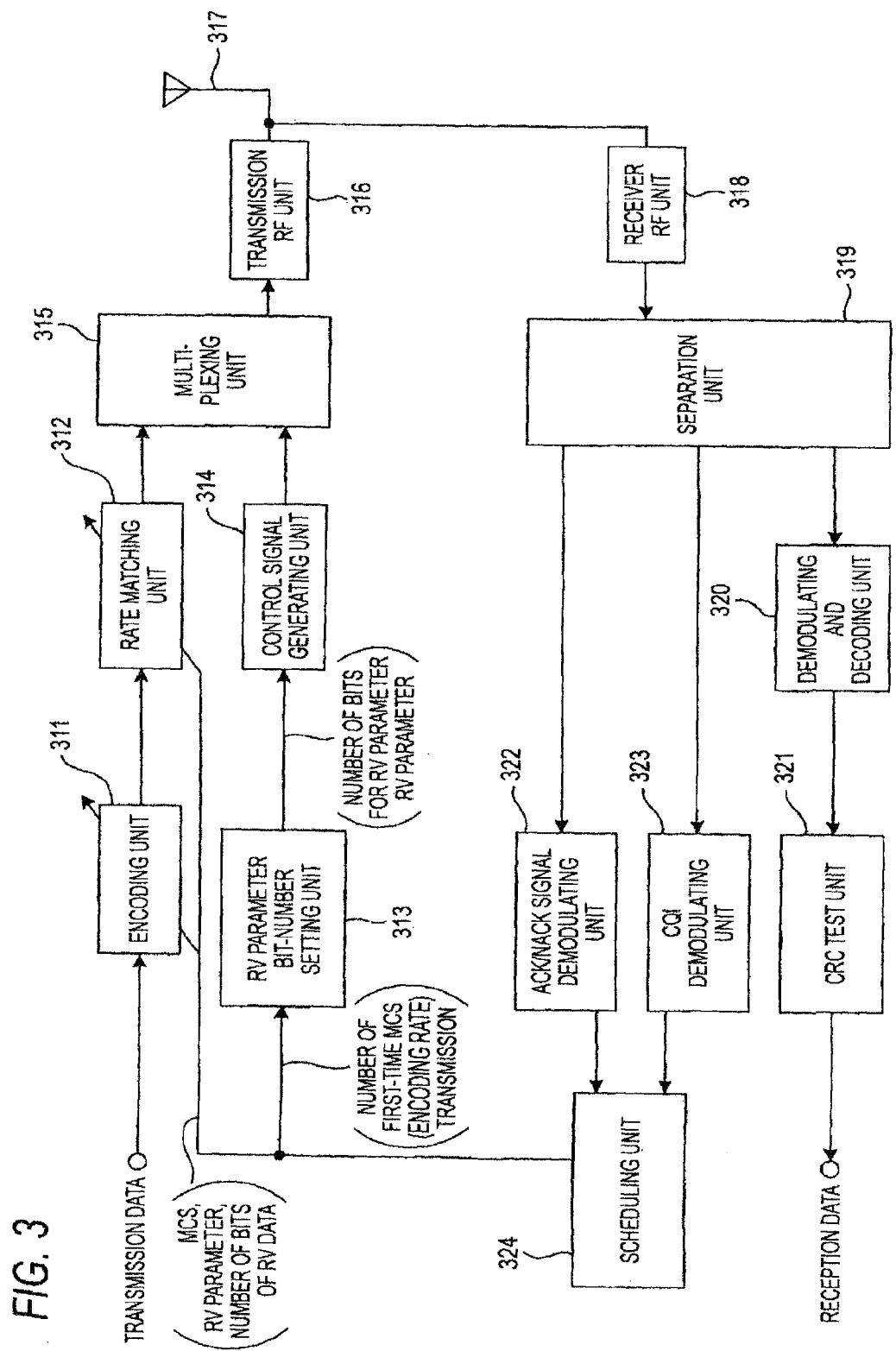
FIG. 3 is a block diagram representing the configuration of the major part of the transmission apparatus used in the first embodiment of the present invention.
Figure 4:
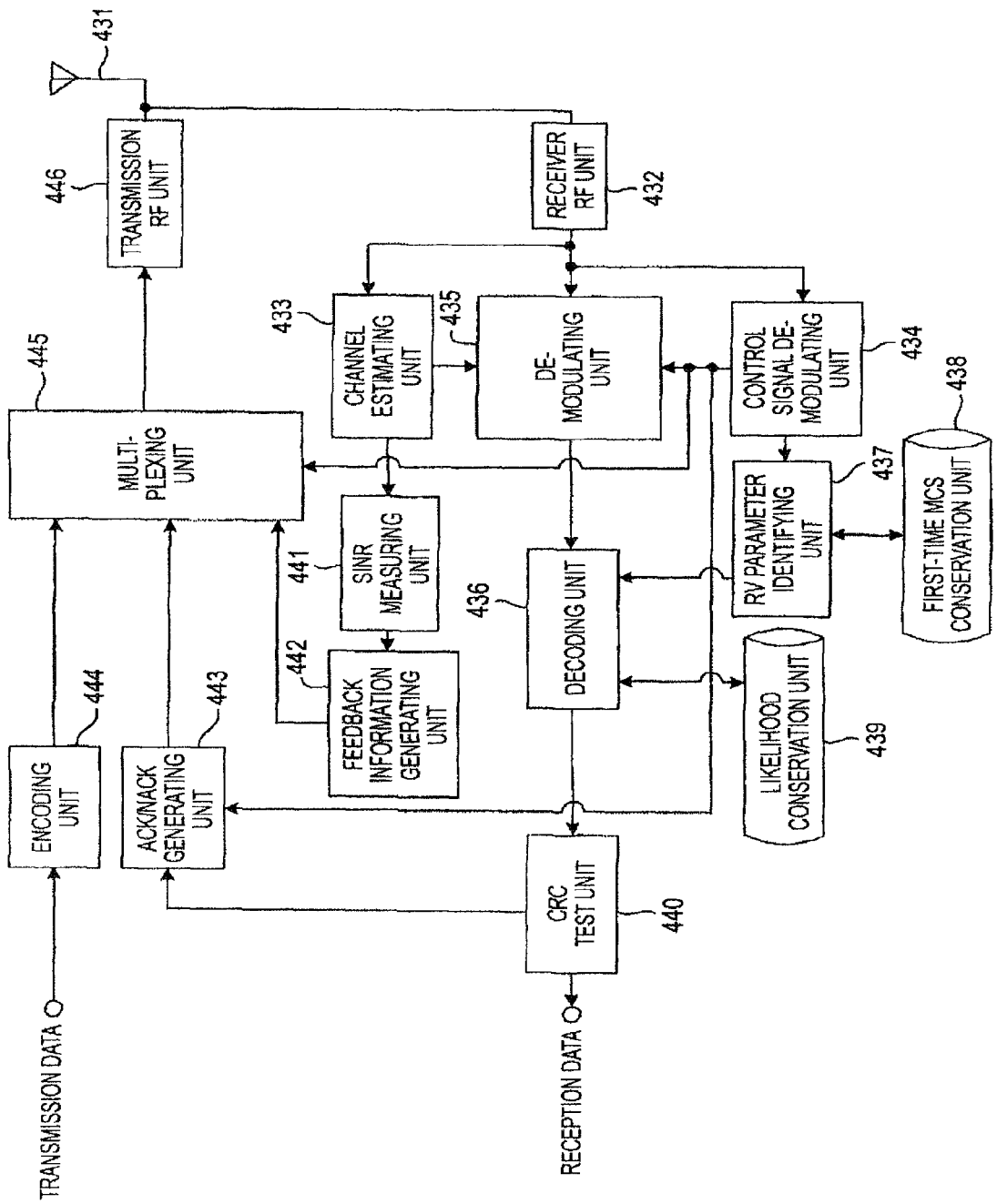
FIG. 4 is a block diagram representing the configuration of the major part of the receiver apparatus used in the first embodiment of the present invention.

FIG. 3 is a block diagram representing the configuration of the major part of the transmission apparatus used in the first embodiment of the present invention. FIG. 4 is a block diagram representing the configuration of the major part of the receiver apparatus used in the first embodiment of the present invention.

In this embodiment, a case where the transmission apparatus shown in FIG. 3 and the receiver apparatus shown in FIG. 4 communicate with each other in a wireless manner by using electric waves is assumed. For example, it is assumed that the transmission apparatus shown in FIG. 3 is applied to a wireless communication base station apparatus (wireless base station; BS) that provides communication services such as mobile communications of cellular phones or the like, and the receiver apparatus shown in FIG. 4 is applied to a user equipment (UE) that is a wireless communication mobile station apparatus such as a cellular phone apparatus.

The transmission apparatus shown in FIG. 3 includes: an encoding unit 311; a rate matching unit 312; an RV parameter bit-number setting unit 313; a control signal generating unit 314; a multiplexing unit 315; a transmission RF unit 316; an antenna 317; a receiver RF unit 318; a separation unit 319, a demodulating and decoding unit 320; a CRC test unit 321; an Ack/Nack signal demodulating unit 322; a CQI demodulating unit 323; and a scheduling unit 324.

The electric wave transmitted from a communication counterpart apparatus (for example, the receiver apparatus shown in FIG. 4) is received by the antenna 317. After the high-frequency signal of the electric wave received by the antenna 317 is converted into a signal of a relatively low frequency band such as a base band signal by the receiver RF unit 318, the converted signal is input to the separation unit 319. The separation unit 319 separates a feedback signal from the reception signal and extracts and outputs CQI (Channel Quality Indicator) information, Ack/Nack information, or the like that is included in the feedback signal. Of the separated feedback signal, the Ack/Nack information is input to the Ack/Nack signal demodulating unit 322, and the CQI information is input to the CQI demodulating unit 323.

The demodulating and decoding unit 320 restores the received data by performing a demodulating process and a decoding process for the reception signal separated by the separation unit 319. The CRC test unit 321 performs an error detection process for a signal after decoding that is output from the demodulating and decoding unit 320 through CRC (cyclic redundancy check) test, and thereby determining whether or not an error is included in the received data that has been decoded. Then, the received data is output by the CRC test unit 321.

The Ack/Nack signal demodulating unit 322 demodulates the Ack/Nack information output from the separation unit 319 and outputs an Ack/Nack signal, which indicates the result of demodulation of the reception signal in the receiver apparatus, to the scheduling unit 324. The CQI demodulating unit 323 demodulates the CQI information such as SINR (Signal to Interference and Noise Ratio) output from the separation unit 319 and outputs a CQI value, which represents the measurement result (reception quality) of the propagation path quality measured in the receiver apparatus, to the scheduling unit 324. The scheduling unit 324 performs a scheduling process based on the Ack/Nack signal output from the Ack/Nack signal demodulating unit 322 and a CQI value that is output from the CQI demodulating unit 323 and outputs retransmission information that includes: execution or non-execution of retransmission, the number of transmissions, and the like; the MCS information that includes the modulation type of a transmission signal, the encoding rate, and the like; the RV parameter information and the like that includes the RV parameter, the number of bits of the RV parameter, and the like. In addition, various types of information relating to a transmission signal such as the retransmission information, the MCS information, and the RV parameter information that are output from the scheduling unit 324 may be referred to as transmission parameters.

The encoding unit 311 performs an encoding process for the transmission data and outputs the encoded transmission data to the rate matching unit 312. The rate matching unit 312 performs a rate matching process in which modulation multiple values and the encoding rate are adaptively set and outputs the processed data to the multiplexing unit 315. Here, the encoding unit 311 and the rate matching unit 312 perform an encoding process and a rate matching process based on the MCS, the RV parameter, and the like that are output from the scheduling unit 324. In the rate matching unit 312, an IR buffer is disposed. The rate matching unit 312 stores the encoded data in the IR buffer, reads out a predetermined amount of data corresponding to the transmission rate and the encoding rate based on a start position designated by the RV parameter at the time of retransmission as retransmission data, and outputs the retransmission data. In the receiver apparatus, a retransmission composition process is performed through the IR mode by using the retransmission data and the first transmission data.

The RV parameter bit-number setting unit 313 receives the MCS information of the first transmission from the scheduling unit 324 and determines the number of bits of the RV parameter based on the encoding rate of the first transmission by using the encoding rate included in the MCS information. In addition, the RV parameter bit-number setting unit 313 receives the MCS information and the retransmission information from the scheduling unit 324 and sets the RV parameter for an appropriate start position according to the number of transmissions based on the determined number of bits of the RV parameter and the number of transmissions of the data. The number of bits of the RV parameter and the RV parameter are input to the control signal generating unit 314, the encoding unit 311, and the rate matching unit 312. A concrete example of the number of bits of the RV parameter and the setting process of the number of bits of the RV parameter will be described later.

The control signal generating unit 314 generates a control signal that includes the RV parameter information as a parameter relating to retransmission control based on the number of bits of the RV parameter and the RV parameter from the RV parameter bit-number setting unit 313 and outputs the control signal to the multiplexing unit 315. In this control signal, the retransmission information, the MCS information, and the like are also included.

The multiplexing unit 315 performs multiple processing for the transmission signal including encoded transmission data, the control signal including the RV parameter information, and the like. Then, the multiplexing unit 315 generates a transmission signal by performing a modulation process and the like and outputs the transmission signal to the transmission RF unit 316. In the transmission RF unit 316, after processes such as serial/parallel conversion, an inverse Fourier transform, and the like are performed for the transmission signal, the transmission signal is converted into a high frequency signal of a predetermined wireless frequency band. Then, after power amplification is performed for the transmission signal, the amplified transmission signal is transmitted from the antenna 317 as an electric wave. The transmission signal transmitted from the transmission apparatus is transmitted to the receiver apparatus as a pilot signal, a control signal, a data signal including various types of data, and the like.

In the above-described configuration, the CQI demodulating unit 323 implements the function of a propagation path quality acquiring unit. In addition, the scheduling unit 324 implements the function of an MCS setting unit and a retransmission control unit. The RV parameter bit-number setting unit 313 implements the function of a parameter bit-number setting unit and a retransmission control parameter setting unit. In addition, the rate matching unit 312, the multiplexing unit 315, and the transmission RF unit 316 implement the function of a transmission processing unit.

On the other hand, the receiver apparatus shown in FIG. 4 includes: an antenna 431; a receiver RF unit 432; a channel estimating unit 433; a control signal demodulating unit 434; a demodulating unit 435; a decoding unit 436; an RV parameter identifying unit 437; a first-time MCS conservation unit 438; a likelihood conservation unit 439; a CRC test unit 440; an SINR measuring unit 441; a feedback information generating unit 442; an Ack/Nack generating unit 443; an encoding unit 444; a multiplexing unit 445, and a transmission RF unit 446.

The electric wave transmitted from a communication counterpart apparatus (for example, the transmission apparatus shown in FIG. 3) is received by the antenna 431. After being converted into a signal of a relatively low frequency band such as a baseband signal by the receiver RF unit 432, the high-frequency signal of the electric wave received by the antenna 431 is converted into a reception signal of serial data by performing processes such as a Fourier transform and parallel/serial conversion. The output of the receiver RF unit 432 is input to the channel estimating unit 433, the control signal demodulating unit 434, and the demodulating unit 435.

The channel estimating unit 433 calculates a channel estimation value by performing channel estimation based on a pilot signal that is included in the signal transmitted from the transmission antenna of the communication counterpart apparatus (transmission apparatus). The calculated channel estimation value is input to the demodulating unit 315 and the SINR measuring unit 441. The control signal demodulating unit 434 extracts control information such as the retransmission information including execution or non-execution of retransmission, the number of transmissions, and the like, the MCS information including the modulation type, the encoding rate, and the like of a transmission signal, the RV parameter information including the RV parameter and the like by demodulating the control signal transmitted together with the pilot signal. The demodulated control signal is input to the demodulating unit 435, the RV parameter identifying unit 437, the Ack/Nack generating unit 443, and the multiplexing unit 445.

The demodulating unit 435 performs a demodulation process for a reception signal corresponding to the receiver apparatus (the receiver apparatus including the demodulating unit) by using the channel estimation value received from the channel estimating unit 433. Then, the demodulating unit 435 performs a deinterleaving process, a rate de-matching process for allowing the modulation multiple values and the encoding rate to match those of the transmission side, and the like and outputs the reception signal after demodulation to the demodulating unit 436. The RV parameter identifying unit 437 outputs the MCS information of the first transmission that is received from the control signal demodulating unit 434 as the information on the encoding rate of the first transmission to the first-time MCS conservation unit 438 so as to be stored therein. In addition, the RV parameter identifying unit 437 calculates and identifies the number of bits of the RV parameter by using the encoding rate of the first transmission based on the MCS information of the first transmission. Then, the RV parameter identifying unit 437 demodulates and identifies the RV parameter assigned to the resources of a corresponding number of bits based on the number of bits of the RV parameter calculated as above and the RV parameter information output from the control signal demodulating unit 434 and outputs the RV parameter to the demodulating unit 436. The likelihood conservation unit 439 conserves likelihood information on reception signals received in the past.

The decoding unit 436 restores the reception data by performing a decoding process for the reception signal input from the demodulating unit 435. At this time, when retransmission is performed, the decoding unit 436 performs a retransmission composition process through the IR mode based on the RV parameter received from the RV parameter identifying unit 437. In other words, the decoding unit 436 at the time of retransmission performs a likelihood composition process or the like in which the likelihood information of the past reception signal conserved in the likelihood conservation unit 439 and the likelihood information of the current reception signal are composed together and outputs the reception data after decoding to the CRC test unit 440. The CRC test unit 440 performs an error detection process for the signal after decoding output from the decoding unit 436 through a CRC test and outputs information on existence of non-existence of data error that indicates whether an error is included in the reception data after decoding to the Ack/Nack generating unit 443. Then, the reception data is output by the CRC test unit 440.

The SINR measuring unit 441 detects the reception state of the pilot signal based on the channel estimation value estimated by the channel estimating unit 433 and calculates the SINR of the signal transmitted from the communication counterpart apparatus (transmission apparatus) as the measurement result of the propagation path quality. The calculated SINR is input to the feedback information generating unit 442. This SINR corresponds to the CQI value that is information representing the propagation path quality for a desired signal. The feedback information generating unit 442 generates feedback information including the CQI information and outputs the feedback information to the multiplexing unit 445.

The Ack/Nack generating unit 443 determines whether or not any error is included in the decoded reception data based on the result of error detection in the CRC test unit 440, generates an Ack/Nack signal, and outputs the Ack/Nack signal to the multiplexing unit 445. Here, when any error is not included in the result of decoding, Ack is generated. On the other hand, when an error is included in the result of decoding, Nack is generated.

The decoding unit 444 performs an encoding process for the transmission data and outputs the encoded transmission data to the multiplexing unit 445. The multiplexing unit 445 performs multiple processing for a transmission signal including the feedback information, the Ack/Nack signal, and the encoded transmission data, which have been input, and the like. Then, the multiplexing unit 445 generates a transmission signal by performing a rate matching process, in which modulation multiple values and the encoding rate are adaptively set, a modulation process, and the like and outputs the generated transmission signal to the transmission RF unit 446. In the transmission RF unit 446, after processes such as serial/parallel conversion, an inverse Fourier transform, and the like are performed for the transmission signal, the transmission signal is converted into a high frequency signal of a predetermined wireless frequency band. Then, after power amplification is performed for the transmission signal, the amplified transmission signal is transmitted from the antenna 431 as an electric wave. At this time, the feedback information including the CQI information and a response signal for the Ack/Nack signal, which have been transmitted from the receiver apparatus, and the like is transmitted to the transmission device as a feedback signal.

In the above-described configuration, the SINR measuring unit 441 and the feedback information generating unit 442 implement the function of a propagation path quality notifying unit. In addition, the receiver RF unit 432, the demodulating unit 435, and the control signal demodulating unit 434 implement the function of a reception processing unit. The first-time MCS conservation unit 438 implements the function of a control information storing unit. In addition, the RV parameter identifying unit 437 implements the function of a retransmission control parameter demodulating unit.

Figure 5:
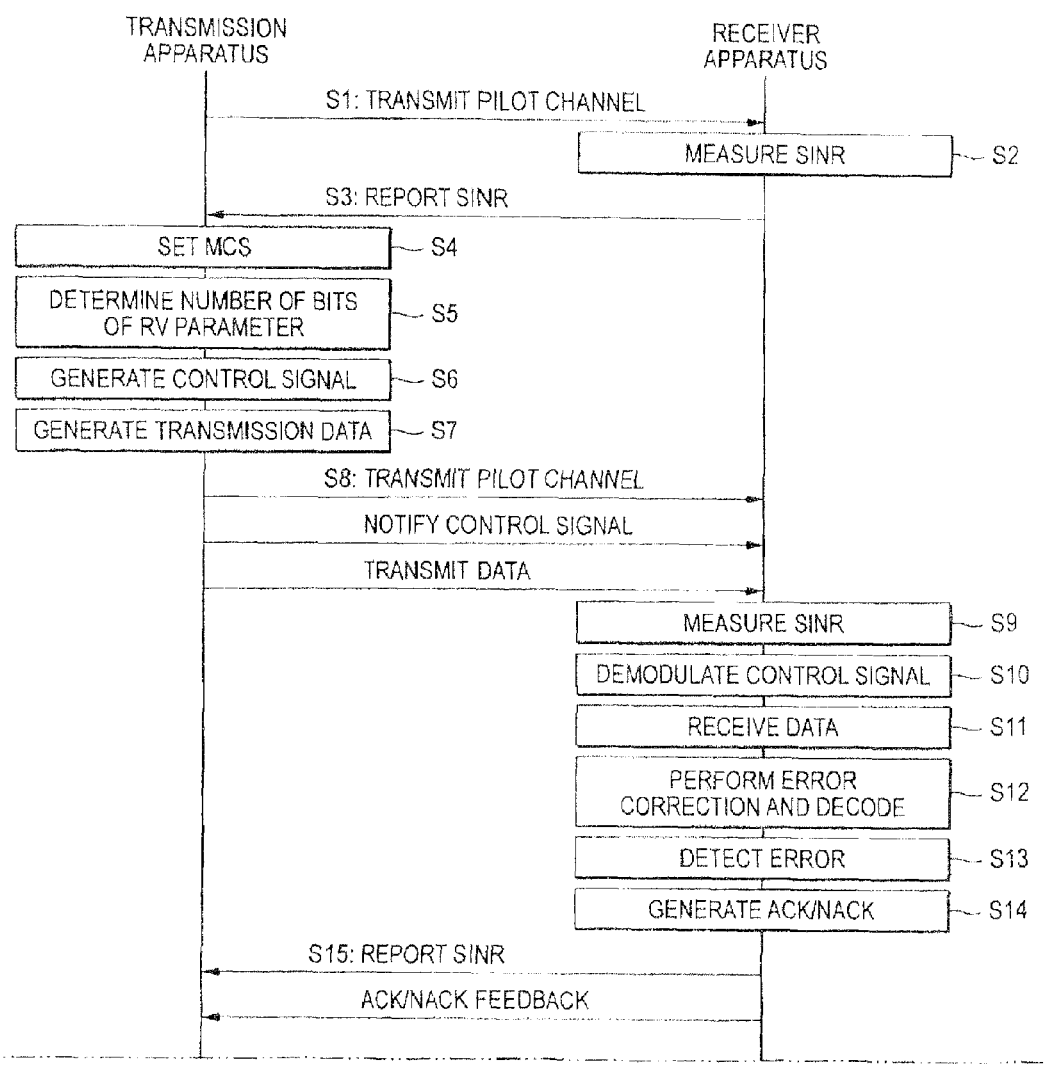
FIG. 5 is a sequence diagram representing a concrete example of the sequence of all the processes relating to the communication between the transmission apparatus and the receiver apparatus according to the first embodiment.

Next, in this embodiment, the processing sequence for a case where the transmission apparatus shown in FIG. 3 and the receiver apparatus shown in FIG. 4 communicate with each other will be described below with reference to FIG. 5. FIG. 5 is a sequence diagram representing a concrete example of the sequence of all the processes relating to the communication between the transmission apparatus and the receiver apparatus according to the first embodiment.

Step S1: The transmission apparatus transmits a pilot channel to the receiver apparatus through the transmission RF unit 316 and the antenna 317.

Step S2: The receiver apparatus receives the pilot channel transmitted from the transmission apparatus through the antenna 431 and the receiver RF unit 432, performs channel estimation of the propagation path by using the channel estimating unit 433, and observes the reception state of the pilot channel. Then, the receiver apparatus measures and calculates the SINR by using the channel estimation value of the pilot channel by using the SINR measuring unit 441

Step S3: The receiver apparatus generates feedback information including the CQI information according to the SINR calculated as above in the feedback information generating unit 442 and reports the CQI information (SINR) representing the quality of the propagation path by transmitting the feedback information to the transmission apparatus through the multiplexing unit 445, the transmission RE unit 446, and the antenna 431.

Step S4: The transmission apparatus receives the feedback information from the receiver apparatus through the antenna 317 and the receiver RF unit 318 and demodulates the CQI information by using the separation unit 319 and the CQI demodulating unit 323. Then, the scheduling unit 324 sets the MCS including the modulation type, the encoding rate, and the like based on the CQI information (SINR) of the pilot channel that is fed back from the receiver apparatus.

Step S5: The transmission apparatus determines the number of bits of the RV parameter based on the MCS set as described above by using the RV parameter bit-number setting unit 313.

Here, the operation of determining the number of bits of the RV parameter in Step S5, which is one of characteristic operations of the transmission apparatus according to this embodiment, will be described in detail. The RV parameter bit-number setting unit 313 receives the MCS (the MCS of the first transmission) transmitted toward the communication counterpart apparatus (the receiver apparatus) by using the scheduling unit 324 and determines the number of bits of the RV parameter based on the encoding rate of the first transmission. In addition, the RV parameter bit-number setting unit 313 receives the retransmission information from the scheduling unit 324 and sets the RV parameter for an appropriate start position of data of first transmission according to the number of transmissions (here, the first transmission). Then, the RV parameter bit-number setting unit 313 outputs the number of the bits of the RV parameter and the RV parameter, which have been determined, to the control signal generating unit 314.

Step S6: The transmission apparatus generates a control signal including the RV parameter information based on the number of bits of the RV parameter and the RV parameter determined as above that is output from the RV parameter bit-number setting unit 313 by using the control signal generating unit 314. In this control signal, the MCS and the information on the number of transmissions are included.

Step S7: The transmission apparatus generates transmission data dedicated for the use of the corresponding receiver apparatus by performing processes by using the decoding unit 311, the rate matching unit 312, and the multiplexing unit 315 based on the MCS set in Step S4.

Step S8: The transmission apparatus transmits the pilot channel, the control signal, and the data signal to the receiver apparatus.

Step S9: The receiver apparatus, similarly to Step S2, measures and calculates the SINR based on the reception state of the pilot channel by using the SINR measuring unit 441.

Step S10: The receiver apparatus extracts the MCS information by demodulating the control signal by using the control signal demodulating unit 434. Here, the RV parameter identifying unit 437 outputs the MCS information of the first transmission to the first-time MCS conservation unit 438 so as to be stored therein.

Step S11: The receiver apparatus performs a reception process by acquiring a channel estimation value of the reception signal by using the channel estimating unit 433 and demodulating the reception data, by using the MCS extracted in Step S10, by using the demodulating unit 435.

Step S12: The receiver apparatus performs an error correction decoding process for the reception data, which has been demodulated in Step S11, by using the decoding unit 436.

Step S13: The receiver apparatus performs an error detection process for the reception data after the error correction decoding of Step S12 by using the CRC test unit 440.

Step S14: The receiver apparatus generates a corresponding Ack/Nack signal based on the result of error detection in Step S13 by using the Ack/Nack generating unit 443.

Step S15: The receiver apparatus generates the feedback information including the SINR information calculated in Step S9 by using the feedback information generating unit 442 and reports the SINR and the Ack/Nack signal generated in Step S14 to the transmission apparatus in a feedback manner.

Step S16: The transmission apparatus demodulates the Ack/Nack signal, which has been fed back from the receiver apparatus, by using the Ack/Nack signal demodulating unit 922.

Step S17: The transmission apparatus determines the start position of the retransmission data and sets the RV parameter representing the start position of the data by using the RV parameter bit-number setting unit 313 in a case where the retransmission is performed by detecting Nack in accordance with the Ack/Nack signal demodulated in Step S16.

Here, the operation of setting the RV parameter in Step S17, which is one of characteristic operations of the transmission apparatus according to this embodiment, will be described in detail. First, the scheduling unit 324, in a case where a Nack signal is received, determines that a retransmission is necessary and outputs the MCS of the first transmission set by the corresponding receiver apparatus and the number of transmissions (for example, the second transmission (first retransmission)) toward the RV parameter bit-number setting unit 313. The RV parameter bit-number setting unit 313 receives the MCS of the first transmission and the number of transmissions and sets an RV parameter representing a start position of data for retransmission for transmitting the remaining data, which has not been transmitted, as much as is possible based on the number of bits of the RV parameter and the number of transmissions of the corresponding data with reference to the number of bits of the RV parameter that is based on the encoding rate of the first transmission determined in Step S5. Then, the RV parameter bit-number setting unit 313 outputs the set RV parameter to the control signal generating unit 314.

Step S18: The transmission apparatus generates a control signal including the RV parameter information set as described above, the MCS information, and the number of transmissions by using the control signal generating unit 314.

Step S19: The transmission apparatus generates transmission data (retransmission data) dedicated for the use of the corresponding receiver apparatus by performing processes by using the rate matching unit 312 and the multiplexing unit 315 based on the MCS set in Step S4 and the RV parameter set in Step S17.

Step S20: The transmission apparatus transmits the pilot channel, the control signal, and the data signal to the receiver apparatus.

Step S21: The receiver apparatus, similarly to Step S9, measures and calculates the SINR based on the reception state of the pilot channel by using the SINR measuring unit 441.

Step S22: The receiver apparatus extracts the MCS information, the RV parameter information, and the number of transmissions by demodulating the control signal by using the control signal demodulating unit 434. Then, the RV parameter identifying unit 437 demodulates and identifies the RV parameter of this transmission based on the RV parameter information.

Here, the operation of identifying the RV parameter in Step S22, which is one of characteristic operations of the receiver apparatus according to this embodiment will be described in detail. The RV parameter identifying unit 437, first, at the first transmission in the above-described Step S10, stores the MCS information of the first transmission received from the control signal demodulating unit 434 in the first-time MCS conservation unit 438. Then, the RV parameter identifying unit 437 receives the number of transmissions from the control signal demodulating unit 434. In the case of a retransmission, the RV parameter identifying unit 437 calculates the number of bits of the RV parameter based on the encoding rate of the first transmission with reference to the MCS information of the first transmission that is stored in the first-time MCS conservation unit 438. Thereafter, the RV parameter identifying unit 437 demodulates and identifies the RV parameter of this transmission assigned to the resources corresponding to the number of bits based on the number of bits of the RV parameter calculated as described above and outputs the RV parameter to the decoding unit 436. In addition, the RV parameter identifying unit 437 may calculate the number of bits of the RV parameter based on the MCS information of the first transmission and conserve the information on the number of bits of the RV parameter in the first-time MCS conservation unit 438 instead of the MCS information of the first transmission.

Step S23: The receiver apparatus performs a reception process by acquiring a channel estimation value of the reception signal by using the channel estimating unit 433 and demodulating the reception data (retransmission data), by using the MCS extracted in Step S22, by using the demodulating unit 435.

Step S24: The receiver apparatus performs a likelihood composition process corresponding to the RV parameter acquired in Step S22 for the reception data of the first transmission from which an error is detected in Step S13 by using the reception data of the retransmission by using the demodulating unit 436 and the likelihood conservation unit 439. At this time, the data of the first transmission and the data of the retransmission are composed by recognizing the data start position for each transmission based on the RV parameter.

Step S25: The receiver apparatus performs an error correction decoding process for the reception data for which the likelihood composition process is performed in Step S24 by using the decoding unit 436.

Step S26: The receiver apparatus performs an error detection process for the reception data after the error correction decoding of Step S25 by using the CRC test unit 440. Then, the Ack/Nack generating unit 443 generates an Ack/Nack signal in accordance with the result of the error detection.

Step S27: The receiver apparatus generates the feedback information including the SINR information calculated in Step S21 by using the feedback information generating unit 442 and reports the SINR and the Ack/Nack signal generated in Step S26 to the transmission apparatus in a feedback manner.

Figure 7:
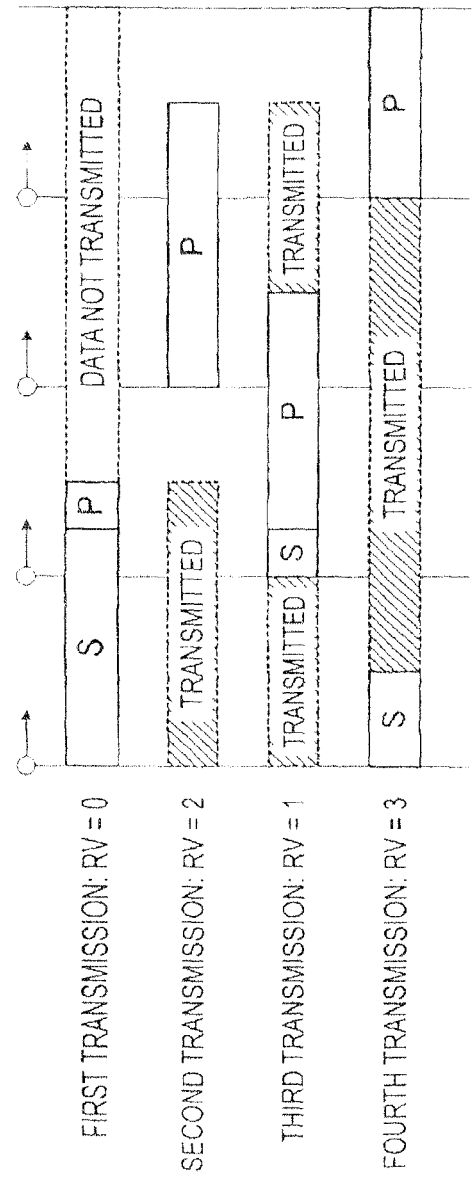
FIG. 7 is a diagram representing an example of setting the RV parameter according to the first embodiment.

Next, a concrete example of setting the number of bits of the RV parameter and the RV parameter according to the first embodiment will be described. FIG. 6 is a diagram representing an example of setting the number of bits of the RV parameter corresponding to the encoding rate. FIG. 7 is a diagram representing an example of setting the RV parameter.

In this embodiment, similarly to the setting example represented in FIG. 6, in a case where the encoding rate R of the first transmission is greater than $2/3$ ($2/3 < R$), the number of bits of the RV parameter is set to two. In a case where the encoding rate R of the first transmission is greater than $1/3$ and equal to or less than $2/3$ ($1/3 < R \le 2/3$), the number of bits of the RV parameter is set to one. On the other hand, in a case where the encoding rate R of the first transmission is equal to or less than $1/3$ ($R \le 1/3$), the number of bits of the RV parameter is set to zero.

For example, in the transmission apparatus, in a case where the encoding rate R of the first transmission is set as $R=5/6$ in accordance with the CQI information (SINR) that has been fed back from the receiver apparatus, the RV parameter bit-number setting unit 313 uniquely sets the number of bits of the RV parameter to two bits. FIG. 7 represents an example of setting of the RV parameter to two bits for a case where the encoding rate $R=5/6$ in the image of the IR buffer.

At the first transmission, the RV parameter is set as RV=0, and from the beginning of the encoded data, systematic bits and a part of the parity bits are transmitted. Then, when Nack is received as a result of decoding the data of the first transmission, the scheduling unit 324 selects and sets as RV=2 so as to transmit the transmission data, which has not been transmitted, inside the IR buffer as much as is possible through the second transmission (first retransmission). Thereafter, in a case when when Nack is additionally received as the result of decoding, and third transmission or a transmission thereafter (second retransmission or a retransmission thereafter) is performed, as described above, in order to transmits the transmission data, which has not been transmitted, as much as is possible, the RV parameter is sequentially set as RV=1 and 3.

As described above, according to the first embodiment, the MCS is set in accordance with the result of measurement of the propagation path quality measured on the reception side, and the number or bits of the RV parameter that is used for controlling the retransmission is set in accordance with the encoding rate of the first transmission in the MCS. At this time, as the encoding rate of the first transmission is decreased, the number of bits of the RV parameter is set to be decreased. Accordingly, in a case where the encoding rate is low, and the granularity of control of the RV parameter is allowed to be rough, the resources for signaling for notification of the RV parameter is reduced. Therefore, the overhead of the RV parameter signaling can be decreased. As a result, the waste of resources for controlling the retransmission can be prevented, and accordingly, the throughput can be improved.

Second Embodiment

Figure 8:
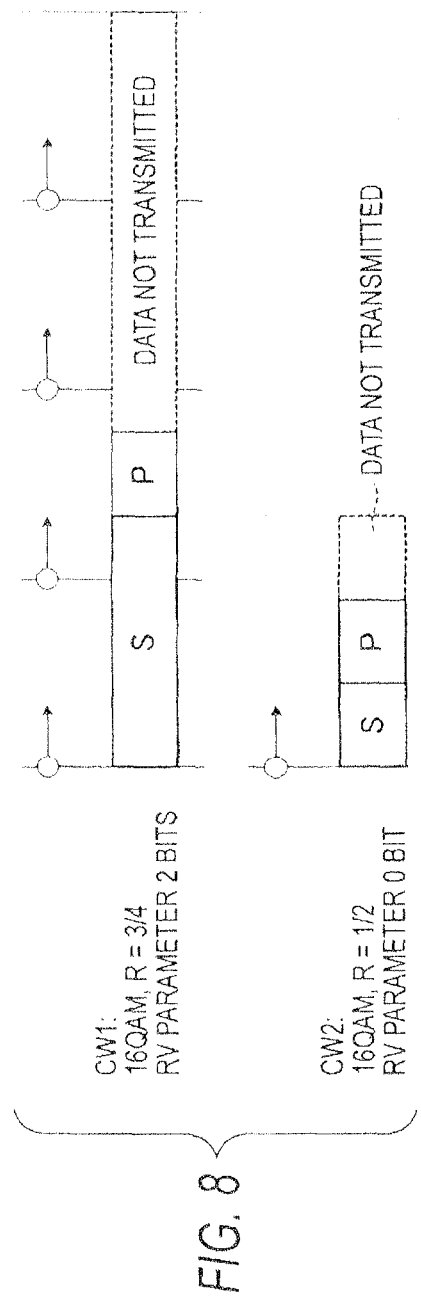
FIG. 8 is a diagram schematically representing a setting example of the RV parameter according to a second embodiment of the present invention.

FIG. 8 is a diagram schematically representing a setting example of the RV parameter according to a second embodiment of the present invention and shows the image of an IR buffer. In the second embodiment, a configuration example is represented in which a plurality of code words is used wherein a code word (CW) represents data series as a control unit of the MCS. Here, a configuration in which the second embodiment is applied to a wireless communication system employing MIMO (Multiple-Input Multiple-Output) is represented as an example.

In the second embodiment, in a case where a retransmission control method is employed in consideration of adaptive MCS control in which a plurality of code words is used, as the encoding rate of the first transmission becomes lower, the number of bits used for signaling of the RV parameter is further decreased.

For example, as represented in the setting example of FIG. 8, in a case where two code words are used, for the first code word (CW 1), the modulation type is 16 QAM. Accordingly, the encoding rate R is high as $R=3/4$, and thus, the number of bits of the RV parameter is set to two bits. On the other hand, for the second code word (CW 2), the modulation type is QPSK, and the encoding rate R is low as $R=1/2$. Thus, the number of bits of the RV parameter is set to zero bits. Accordingly, for CW 1 of which the encoding rate is high and a more flexible setting for the RV parameter is necessary, the number of bits of the RV parameter is set to be large so as to allow the degree of freedom to be high, and flexible retransmission control can be set. In this state, for CW 2, while by setting the number of the bits of the RV parameter is set to be small as zero, compared to a case where both the code words are configured by 2 bit, overhead of the RV parameter signaling of a total of two bits can be reduced in the entirety of two code words.

As described above, by setting the number of bits of the RV parameter to be decreased for a code word of which the encoding rate of the first transmission becomes lower, the waste of resources for the RV parameter can be prevented for a code word having a low encoding rate. In such a case, while flexible retransmission control can be set for a code word of which the encoding rate of the first transmission, in which there is a large amount of untransmitted data, is high, the resources for RV parameter signaling in the down bound direction that is used for a code word on which the influence of a decrease in the degree of freedom of the RV parameter is small can be decreased. Accordingly, the overhead of the retransmission control signaling for a plurality of code words can be decreased.

Next, the configurations of concrete examples of the transmission apparatus and the receiver apparatus of the wireless communication system according to the second embodiment will be described.

Figure 9:
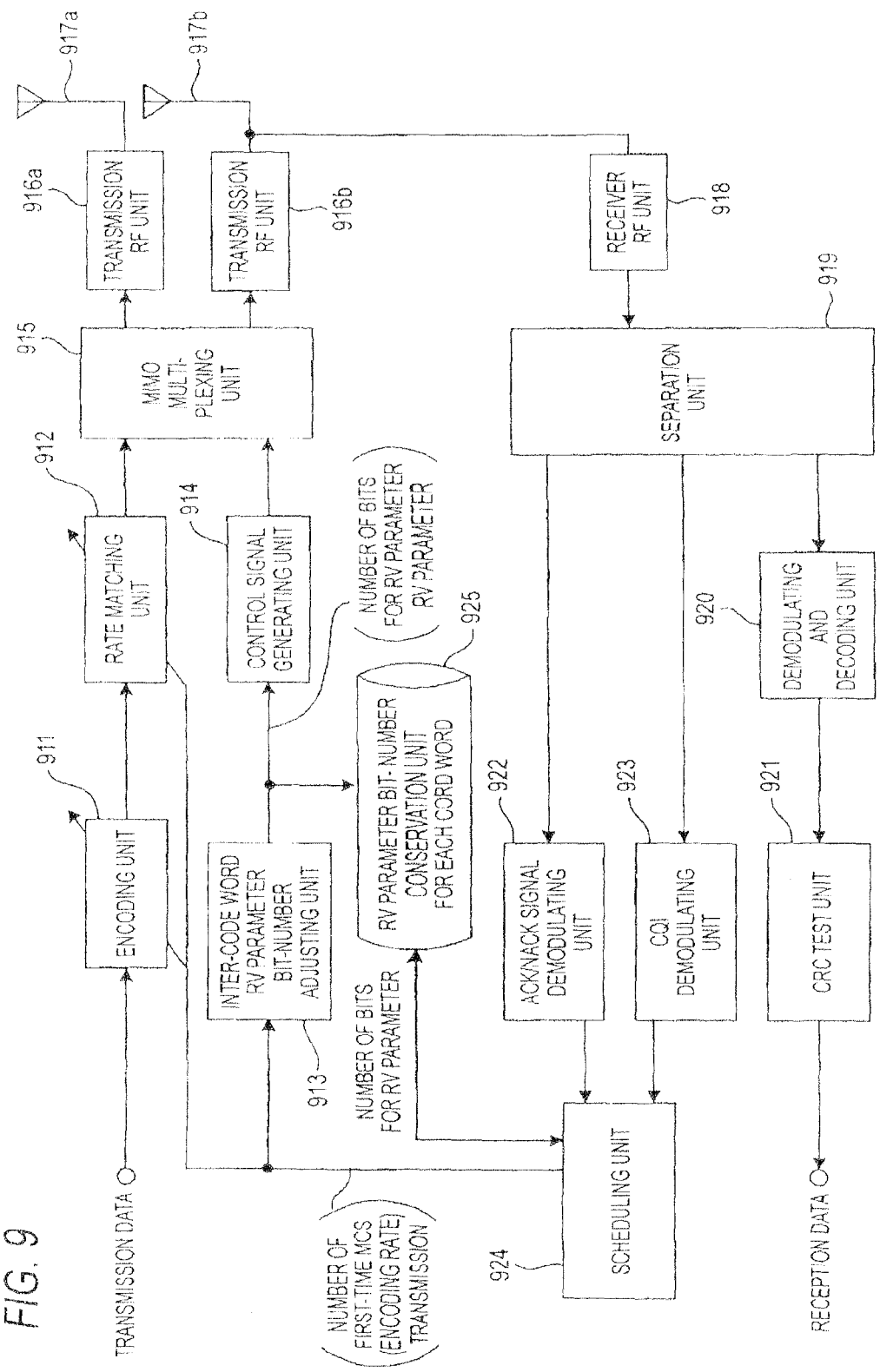
FIG. 9 is a block diagram representing the configuration of the major part of the transmission apparatus used in the second embodiment of the present invention.
Figure 10:
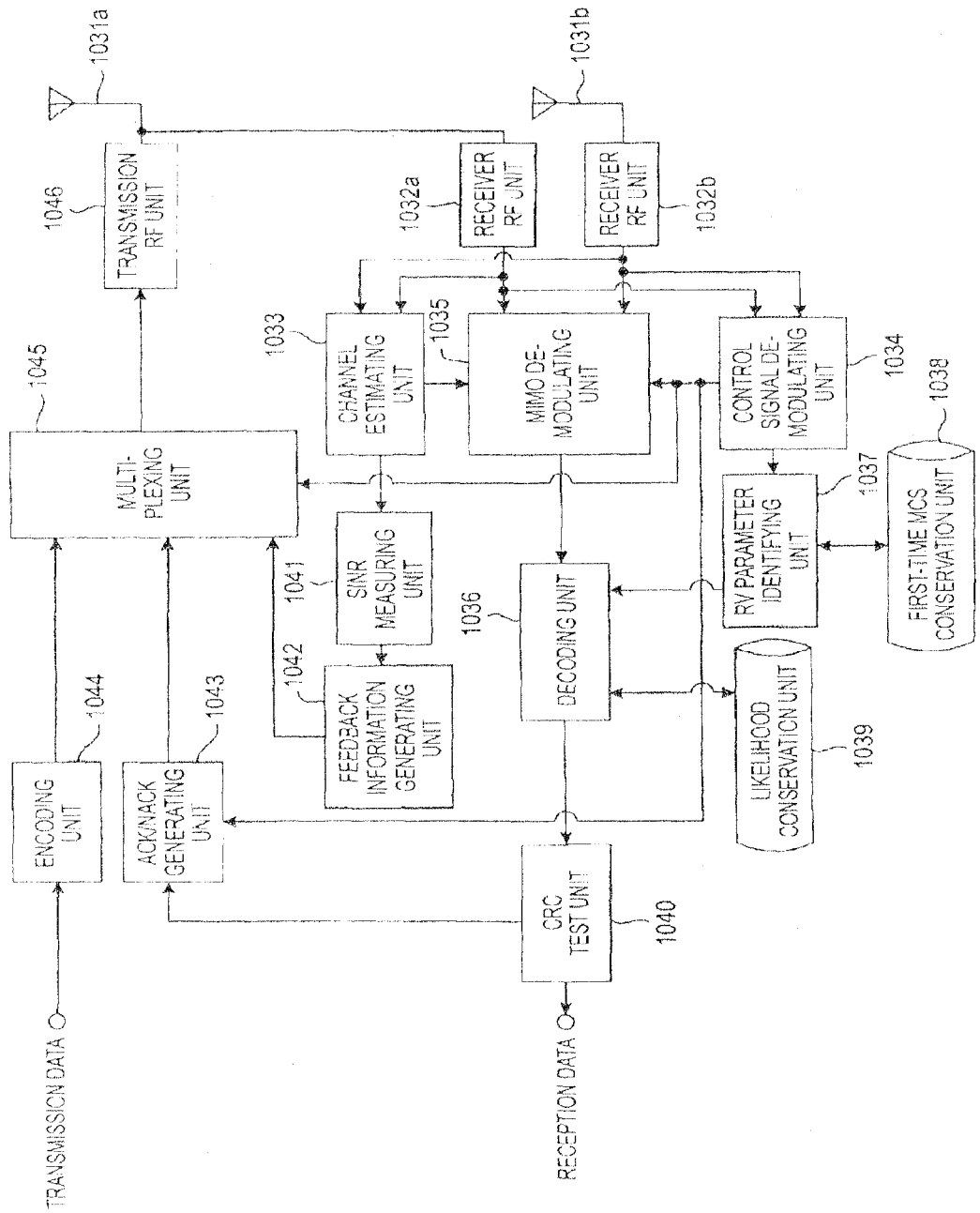
FIG. 10 is a block diagram representing the configuration of the major part of the receiver apparatus used in the second embodiment of the present invention.

FIG. 9 is a block diagram representing the configuration of the major pad of the transmission apparatus used in the second embodiment of the present invention. FIG. 10 is a block diagram representing the configuration of the major part of the receiver apparatus used in the second embodiment of the present invention.

In the second embodiment, a case where the transmission apparatus shown in FIG. 9 and the receiver apparatus shown in FIG. 10 communicate with each other in a wireless manner by using electric waves is assumed. For example, it is assumed that the transmission apparatus shown in FIG. 9 is applied to a wireless communication base station apparatus (wireless base station; BS) of the cellular system that provides communication services such as mobile communications of cellular phones or the like, and the receiver apparatus shown in FIG. 10 is applied to a user equipment (UE) that is a wireless communication mobile station apparatus such as a cellular phone apparatus. Here, there is a premise that an MIMO system, which performs wireless transmission and wireless reception by using a plurality of antennas on both transmission and reception sides, is configured. In addition, as the form of a communication signal, for example, a case where sequential transmission is performed in units of packets by performing communication in a multiple carrier communication mode by using OFDM (Orthogonal Frequency Division Multiplexing) signals or the like is assumed.

The transmission apparatus shown in FIG. 9 includes: an encoding unit 911; a rate matching unit 912; an inter-code word RV parameter bit-number adjusting unit 913; a control signal generating unit 914; an MIMO multiplexing unit 915; a plurality of transmission RF units 916a and 916b; a plurality of antennas 917a and 917b; a receiver RF unit 918; a separation unit 919, a demodulating and decoding unit 920; a CRC test unit 921; an Ack/Nack signal demodulating unit 922; a CQI demodulating unit 923; a scheduling unit 924; and RV parameter bit-number conservation units 925 for each code word.

The electric wave transmitted from a communication counterpart apparatus (for example, the receiver apparatus shown in FIG. 10) is received by the antenna 917b. After the high-frequency signal of the electric wave received by the antenna 917b is converted into a signal of a relatively low frequency band such as a base band signal by the receiver RE unit 918, the converted signal is input to the separation unit 919. The separation unit 919 separates a feedback signal from the reception signal and extracts and outputs CQI (Channel Quality Indicator) information, in Ack/Nack information, and the like of each code word included in the feedback signal. Of the separated feedback signal, the Ack/Nack information of each code word is input to the Ack/Nack signal demodulating unit 922, and the CQI information is input to the CQI demodulating unit 923.

The demodulating and decoding unit 920 restores the received data by performing a demodulating process and a decoding process for the reception signal separated by the separation unit 919. The CRC test unit 921 performs an error detection process for a signal after decoding that is output from the demodulating and decoding unit 920 through CRC test, and thereby determining whether or not an error is included in the received data that has been decoded. Then, the received data is output by the CRC test unit 921.

The Ack/Nack signal demodulating unit 922 demodulates the Ack/Nack information output from the separation unit 919 and outputs an Ack/Nack signal, which indicates the result of demodulation of the reception signal of each code word in the receiver apparatus, to the scheduling unit 924. The CQI demodulating unit 923 demodulates the CQI information such as SINR output from the separation unit 919 and outputs a CQI value, which represents the measurement result (reception quality) of the propagation path quality of each code word measured in the receiver apparatus, to the scheduling unit 924. The scheduling unit 924 performs a scheduling process of a plurality of code words based on the Ack/Nack signal of each code word output from the Ack/Nack signal demodulating unit 922 and a CQI value of each code word that is output from the CQI demodulating unit 923 and outputs retransmission information that includes: execution or non-execution of retransmission, the number of transmissions, and the like; the MCS information that includes the modulation type of a transmission signal, an encoding rate, and the like; the RV parameter information that includes the RV parameter, the number of bits of the RV parameter, and the like; and the like as transmission parameters. In addition, the scheduling unit 924, based on the MCS information and the retransmission information, sets the RV parameter for an appropriate start position in accordance with the number of transmissions for each code word based on the number of bits of the RV parameter determined by the inter-code word RV parameter bit-number adjusting unit 913 and the number of transmissions of the data.

The encoding unit 911 performs an encoding process for the transmission data of a plurality of code words and outputs the encoded transmission data to the rate matching unit 912. The rate matching unit 912 performs a rate matching process in which modulation multiple values and the encoding rate are adaptively set and outputs the processed data to the MIMO multiplexing unit 915. Here, the encoding unit 911 and the rate matching unit 912 perform an encoding process and a rate matching process based on the MCS, the RV parameter, and the like that are output from the scheduling unit 924. In the rate matching unit 912, an IR buffer is disposed for each code word. The rate matching unit 912 stores the encoded data of a plurality of code words in the IR buffers, reads out a predetermined amount of data corresponding to the transmission rate and the encoding rate based on a start position designated by the RV parameter at the time of retransmission as retransmission data, and outputs the retransmission data. In the receiver apparatus, a retransmission composition process is performed for each code word through the IR mode by using the retransmission data and the first transmission data.

The inter-code word RV parameter bit-number adjusting unit 913 receives the MCS information of the first transmission from the scheduling unit 924 and determines the number of bits of the RV parameter by adjusting between code words based on the encoding rates of the first transmission by using the encoding rates included in the MCS information of the code words. At this time, the inter-code word RV parameter bit-number adjusting unit 913 sets the number of bits of the RV parameter for each code word such that the number of bits of the RV parameter becomes smaller as the code word has a relatively lower encoding rate by comparing the encoding rates of the first transmission between the code words while maintaining a total number of the bits of the plurality of RV parameters to be constant. The set numbers of bits of the RV parameters of the code words are output to the control signal generating unit 914 and are input to the RV parameter bit-number conservation unit 925 for each code word to be stored therein. In addition, the inter-code words RV parameter bit-number adjusting unit 913 receives the RV parameters from the scheduling unit 924 and outputs the RV parameters to the control signal generating unit 914.

The control signal generating unit 914 generates a control signal that includes the RV parameter information as a parameter relating to retransmission control based on the number of bits of the RV parameter and the RV parameter output from the inter-code word RV parameter bit-number adjusting unit 913 and outputs the control signal to the MIMO multiplexing unit 915. In this control signal, the retransmission information, the MCS information, and the like are also included.

The MIMO multiplexing unit 915 performs multiple processing for the transmission signals including encoded transmission data of a plurality of code words, the control signals including the RV parameter information, and the like. Then, the MIMO multiplexing unit 915 separates and generates transmission signals to be output to the plurality of antennas by performing a modulation process and the like and outputs the transmission signals to the transmission RF units 916a and 916b. In the transmission RF units 916a and 916b, after processes such as serial/parallel conversion, an inverse Fourier transform, and the like are performed for the transmission signals, the transmission signals are converted into high frequency signals of a predetermined wireless frequency band. Then, after power amplification is performed for the transmission signals, the amplified transmission signals are transmitted from the plurality of independent antennas 917a and 917b as electric waves. The transmission signals transmitted from the transmission apparatus are transmitted to the receiver apparatus as pilot signals, control signals, data signals including various types of data, and the like.

In the above-described configuration, the CQI demodulating unit 923 implements the function of a propagation path quality acquiring unit. In addition, the scheduling unit 924 implements the function of an MCS setting unit, a retransmission control unit, and a retransmission control parameter setting unit. The inter-code words RV parameter bit-number adjusting unit 913 implements the function of a parameter bit-number setting unit. In addition, the rate matching unit 912, the multiplexing unit 915, and the transmission RF units 916a and 916b implement the function of a transmission processing unit.

On the other hand, the receiver apparatus shown in FIG. 10 includes: a plurality of antennas 1031a and 1031b; a plurality of receiver RF units 1032a and 1032b; a channel estimating unit 1033; a control signal demodulating unit 1034; a MIMO demodulating unit 1035; a decoding unit 1036; an RV parameter identifying unit 1037; a first-time MCS conservation unit 1038; a likelihood conservation unit 1039; a CRC test unit 1040; an SINR measuring unit 1041; a feedback information generating unit 1042; an Ack/Nack generating unit 1043; an encoding unit 1044; a multiplexing unit 1045, and a transmission RE unit 1046.

The electric waves transmitted from a communication counterpart apparatus (for example, the transmission apparatus shown in FIG. 9) are received by the plurality of independent antennas 1031a and 1031b. After being converted into a signal of a relatively low frequency band such as a baseband signal by the receiver RF unit 1032a, the high-frequency signal of the electric wave received by the antenna 1031a is converted into a reception signal of serial data by performing processes such as a Fourier transform and parallel/serial conversion. Similarly, after being converted into a signal of a relatively low frequency band such as a baseband signal by the receiver RF unit 1032b, the high-frequency signal of the electric wave received by the antenna 1031b is converted into a reception signal of serial data by performing processes such as a Fourier transform and parallel/serial conversion. The outputs of the receiver RF units 1032a and 1032b are input to the channel estimating unit 1033, the control signal demodulating unit 1034, and the MIMO demodulating unit 1035.

The channel estimating unit 1033 calculates a channel estimation value by performing channel estimation based on a pilot signal that is included in the signal transmitted from each transmission antenna of the communication counterpart apparatus (transmission apparatus). The calculated channel estimation values are input to the MIMO demodulating unit 1035 and the SINR measuring unit 1041. The control signal demodulating unit 1034 extracts control information such as the retransmission information including execution or non-execution of retransmission, the number of transmissions, and the like, the MCS information including the modulation type, the encoding rate, and the like of the transmission signal, the RV parameter information including the RV parameter and the like by demodulating the control signal transmitted together with the pilot signal. The demodulated control signal is input to the MIMO demodulating unit 1035, the RV parameter identifying unit 1037, the Ack/Nack generating unit 1043, and the multiplexing unit 1045.

The MIMO demodulating unit 1035 performs a demodulation process for a reception signal corresponding to the receiver apparatus (the receiver apparatus including the demodulating unit) by using the channel estimation value received from the channel estimating unit 1033. Then, the MIMO demodulating unit 1035 performs a deinterleaving process, a rate de-matching process for allowing the modulation multiple values and the encoding rate to match those of the transmission side, and the like and outputs the reception signals of the plurality of code words after demodulation to the demodulating unit 1036. The RV parameter identifying unit 1037 outputs the MCS information of the first transmission that is received from the control signal demodulating unit 1034 to the first-time MCS conservation unit 1038 so as to be stored therein. In addition, the RV parameter identifying unit 1037 calculates the number of bits of the RV parameter of each code word by using the encoding rate of the first transmission based on the MCS information of the first transmission. Then, the RV parameter identifying unit 1037 demodulates and identifies the RV parameter of each code word assigned to the resources of a corresponding number of bits based on the number of bits of the RV parameter calculated as above and the RV parameter information output from the control signal demodulating unit 1034 and outputs the RV parameter to the demodulating unit 1036. The likelihood conservation unit 1039 conserves likelihood information on reception signals of the code words received in the past.

The decoding unit 1036 restores the reception data by performing a decoding process for the reception signal of each code word that is input from the MIMO demodulating unit 1035. At this time, when retransmission is performed, the decoding unit 1036 performs a retransmission composition process for each code word through the IR mode based on the RV parameter received from the RV parameter identifying unit 1037. In other words, the decoding unit 1036 at the time of retransmission performs a likelihood composition process or the like in which the likelihood information of the past reception signal conserved in the likelihood conservation unit 1039 and the likelihood information of the current reception signal are composed together and outputs the reception data of the plurality of code words after decoding to the CRC test unit 1040. The CRC test unit 1040 performs an error detection process for the signal of each code word after decoding output from the decoding unit 1036 through a CRC test and outputs information on existence of non-existence of data error that indicates whether an error is included in the reception data after decoding to the Ack/Nack generating unit 1043. Then, the reception data of each code word is output by the CRC test unit 440.

The SINR measuring unit 1041 detects the reception state of the pilot signal based on the channel estimation value estimated by the channel estimating unit 1033 and calculates the SINR of each code word that is transmitted from the communication counterpart apparatus (transmission apparatus) for each antenna. The calculated SINR of each code word is input to the feedback information generating unit 1042. This SINR corresponds to the CQI value that is information representing the propagation path quality for a desired signal. The feedback information generating unit 1042 generates feedback information including the CQI information of each code word and outputs the feedback information to the multiplexing unit 1045.

The Ack/Nack generating unit 1043 determines whether or not any error is included in the decoded reception data based on the result of error detection of each code word in the CRC test unit 1040, generates an Ack/Nack signal for each code word, and outputs the Ack/Nack signal to the multiplexing unit 1045. Here, when any error is not included in the result of decoding, Ack is generated. On the other hand, when an error is included in the result of decoding, Nack is generated.

The encoding unit 1044 performs an encoding process for the transmission data and outputs the encoded transmission data to the multiplexing unit 1045. The multiplexing unit 1045 performs multiple processing for a transmission signal including the feedback information, the Ack/Nack signal, and the encoded transmission data, which have been input, and the like. Then, the multiplexing unit 1045 generates a transmission signal by performing a rate matching process, in which modulation multiple values and the encoding rate are adaptively set, a modulation process, and the like and outputs the generated transmission signal to the transmission RF unit 1046. In the transmission RF unit 1046, after processes such as serial/parallel conversion, an inverse Fourier transform, and the like are performed for the transmission signal, the transmission signal is converted into a high frequency signal of a predetermined wireless frequency band. Then, after power amplification is performed for the transmission signal, the amplified transmission signal is transmitted from the antenna 1031*a* as an electric wave. At this time, the feedback information including the CQI information of each code word and a response signal for the Ack/Nack signal, which have been transmitted from the receiver apparatus, and the like is transmitted to the transmission device as a feedback signal.

In the above-described configuration, the SINR measuring unit 1041 and the feedback information generating unit 1042 implement the function of a propagation path quality notifying unit. In addition, the receiver RF units 1032*a*, 1032*b*, the MIMO demodulating unit 1035, and the control signal demodulating unit 1034 implement the function of a reception processing unit. The first-time MCS conservation unit 1038 implements the function of a control information storing unit. In addition, the RV parameter identifying unit 1037 implements the function of a retransmission control parameter demodulating unit.

Next, the operation of setting the RV parameter for a plurality of code words, which is one of characteristic operations of the transmission apparatus according to this embodiment, will be described in detail.

When the numbers of bits of the RV parameters for the plurality of code words are set, the inter-code word RV parameter bit-number adjusting unit 913 sets the number of bits of the RV parameter for each code word such that the number of bits of the RV parameter becomes smaller as the code word has a relatively lower encoding rate by comparing the encoding rates of the first transmission between the code words while maintaining a total number of the bits of the RV parameters to be constant. Then, the inter-code word RV parameter bit-number adjusting unit 913 outputs the set value of the number of bits of the RV parameter for each code word to the RV parameter bit-number conservation unit 925 to be stored therein.

At the time of retransmission of each code word, the scheduling unit 924 sets the RV parameter for the corresponding code word by referring to the number of bits of the RV parameter that is stored in the RV parameter bit-number conservation unit 925 for each code word. In addition, the inter-code word RV parameter bit-number adjusting unit 913 may set the RV parameter for each code word. The control signal generating unit 914 generates a control signal including the RV parameter information with the number of bits directed by the inter-code word RV parameter bit-number adjusting unit 913 being used as the base, based on the RV parameter received from the scheduling unit 924 through the inter-code word RV parameter bit-number adjusting unit 913.

In addition, the operation of identifying the RV parameters of a plurality of code words, which is one of characteristic operations of the receiver apparatus according to this embodiment, will be described in detail.

The RV parameter identifying unit 1037, at the time of first transmission, stores the MCS information of the first transmission of each code word that is received from the control signal demodulating unit 1034 in the first-time MCS conservation unit 1038. Then, the RV parameter identifying unit 1037 receives the number of transmissions from the control signal demodulating unit 1034. Then, in the case of retransmission, the RV parameter identifying unit 1037 calculates the number of bits of the RV parameter of each code word based on the encoding rate of the first transmission by referring to the MCS information of the first transmission that is stored in the first-time MCS conservation unit 1038. Thereafter, the RV parameter identifying unit 1037 demodulates and identifies the RV parameter of this transmission for each code word, which is assigned to the resources of the corresponding number of bits, based on the number of bits of the RV parameter calculated as described above and outputs the RV parameter to the decoding unit 1036. Here, the RV parameter identifying unit 1037 may calculate the number of bits of the RV parameter based on the MCS information of the first transmission and conserve the information on the number of bits of the RV parameter instead of the MCS information of the first transmission in the first-time MCS conservation unit 1038.

Next, a concrete example of setting the number of bits of the RV parameter according to the second embodiment will be described. In a case where there are two code words, for example, similarly to the above-described example of FIG. 8, the total number of the bits of the RV parameter is set to two bits, the number of bits of the RV parameter of a code having a higher encoding rate is set to two bits, and the number of bits of the RV parameter of a code having a lower encoding rate is set to zero bits.

FIG. 11 is a diagram representing examples of setting the number of bits of the RV parameter according to the decoding rate and represents examples in which there are three code words. Here, the total number of the bits of the RV parameter is set to seven bits in both Example 1 and Example 2.

In Example 1, the number of bits of the RV parameter of the first code word (CW 1) having the highest encoding rate R=0.75 is set to four bits, the number of bits of the RV parameter of the third code word (CW 3) having the second highest encoding rate R=0.50 is set to two bits, and the number of bits of the RV parameter of the second code word (CW 2) having the lowest encoding rate R=0.33 is set to one bit. In addition, in Example 2, the number of bits of the RV parameter of the first code word (CW 1) having the highest encoding rate R=0.80 is set to four bits, the number of bits of the RV parameter of the second code word (CW 2) having the second highest encoding rate R=0.75 is set to two bits, and the number of bits of the RV parameter of the third code word (CW 3) having the lowest encoding rate R=0.50 is set to one bit.

In the above-described example, an example in which the number of bits of the RV parameter is relatively determined in accordance with the order of the encoding rates of the code words has been shown as an example. However, similarly to the first embodiment, after the number of bits of the RV parameter of each code word is individually set in accordance with the encoding rate, the numbers of bits of the RV parameters may be adjusted such that a total of the numbers of the bits of the RV parameters of all the code words is a predetermined number of bits.

As described above, according to the second embodiment, in the adaptive MCS control using a plurality of code words, the MCS is set in accordance with the measurement result of the propagation path quality of each code word, and the number of bits of the RV parameter of each code word for retransmission control in set in accordance with the encoding rate in the MCS of the first transmission. At this time, as the encoding rate of the first transmission become lower, the number of bits of the RV parameter is set to be smaller. Accordingly, for a code word having a high encoding rate at the first transmission at which there is much data that has not been transmitted, a large number of bits of the parameter is assigned, so that flexible retransmission control can be set, and the signaling resource for notification of the RV parameter used for a code word that is not influenced much by lowering the degree of freedom of the RV parameter is reduced. Accordingly, the overhead of the RV parameter signaling of a plurality of code words can be decreased. As a result, the waste of resources for controlling the retransmission can be prevented in a case where a plurality of code words is used, and accordingly, the throughput can be improved.

Third Embodiment

Figure 12:
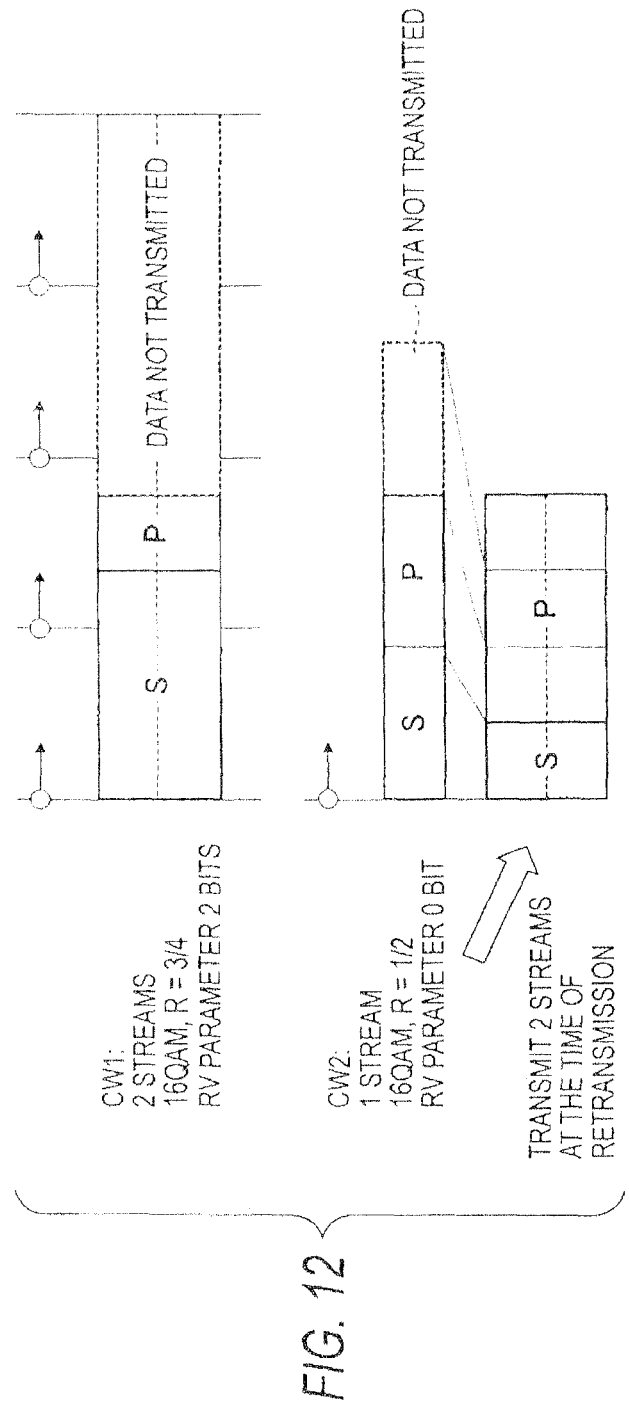
FIG. 12 is a diagram schematically representing a setting example of the RV parameter according to a third embodiment of the present invention.

FIG. 12 is a diagram schematically representing a setting example of the RV parameter according to a third embodiment of the present invention and shows the image of an IR buffer. In the third embodiment, a configuration example of a case where a plurality of streams (signals) is transmitted for one code word in a case where a plurality of code words according to the second embodiment is used is represented.

According to the third embodiment, in a case where a retransmission control method assuming the adaptive MCS control using a plurality of code words is employed, the number of bits used for signaling the RV parameter is decreased for a code word having a smaller number of streams of the first transmission.

For example, as represented in the setting example of FIG. 12, a case where two code words are used, two streams are transmitted in the first code word (CW 1) and one stream is transmitted in the second code word (CW 2) is assumed. In such a case, in CW 1, the modulation type is 16 QAM, the encoding rate R is R=¾, and the number of streams is large as being two. Accordingly, the number of bits of the RV parameter is set to two bits. On the other hand, in the CW 2, the modulation type is 16 QAM, the encoding rate R is R=½, and the number of streams is small as being one. Accordingly, the number of bits of the RV parameter is set to zero bits. Therefore, at the time of retransmission, in CW 2 in which two streams can be transmitted, the number of bits of the RV parameter is decreased. As a result, compared to a case where both the code words are set to two bits, the overhead of the RV parameter signaling of a total of two bits can be reduced in the entirety of the two code words.

As described above, by setting the number of bits of the RV parameter to be smaller for a code word having a smaller number of streams of the first transmission, the resource for the RV parameter can be reduced for a code word that may transmit untransmitted data much more with high possibility by increasing the number of streams at the time of retransmission. In such a case, while flexible retransmission control can be set for a code word having a large number of streams of the first transmission, an increase in the number of streams can be responded, and the resources for RV parameter signaling in the down bound direction that is used for a code word on which the influence of a decrease in the degree of freedom of the RV parameter is small can be decreased. Accordingly, the overhead of the retransmission control signaling for a plurality of code words can be decreased.

Next, the configurations of concrete examples of the transmission apparatus and the receiver apparatus of the wireless communication system according to the third embodiment will be described.

Figure 13:
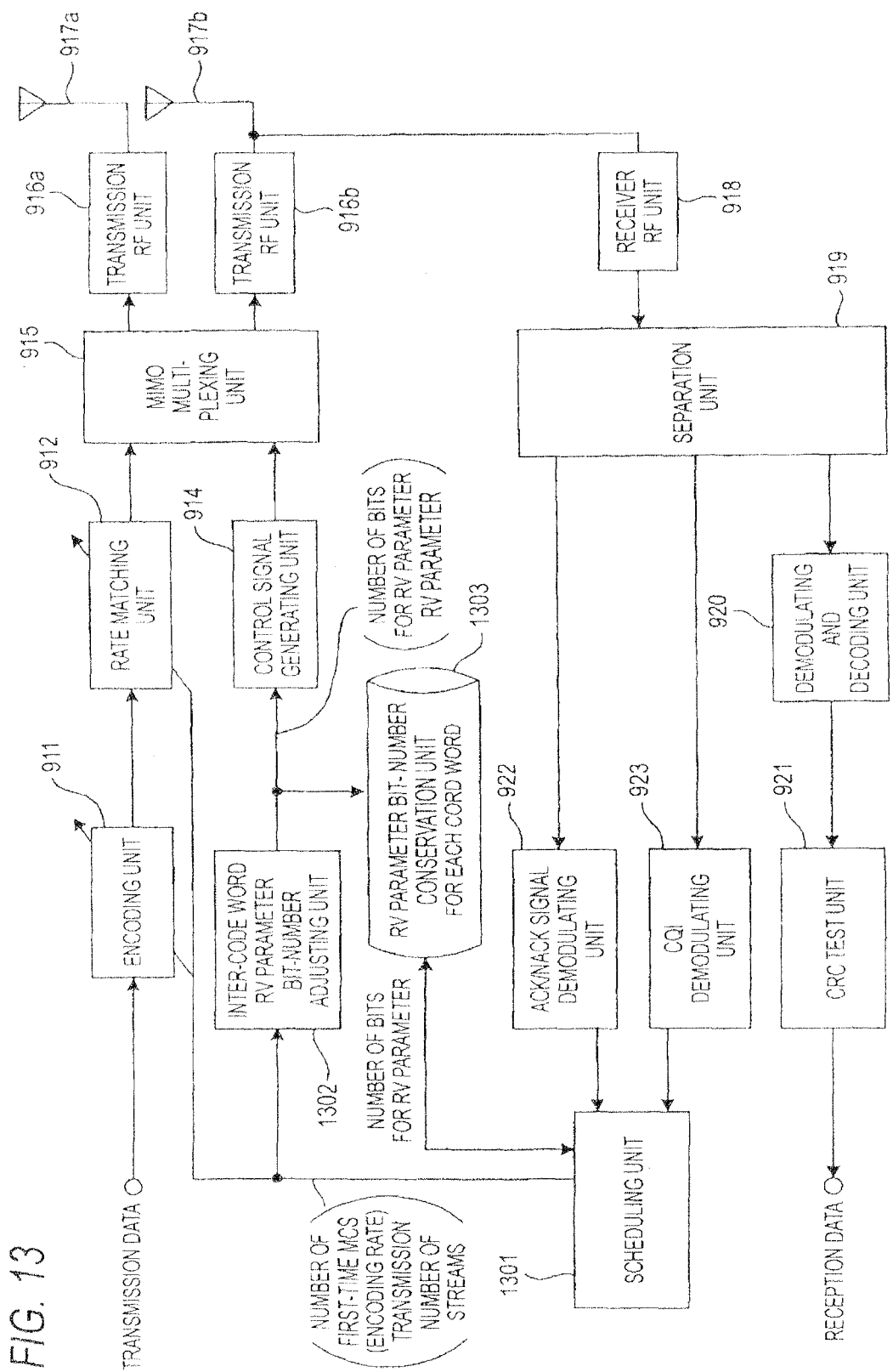
FIG. 13 is a block diagram representing the configuration of the major part of a transmission apparatus used in the third embodiment of the present invention.
Figure 14:
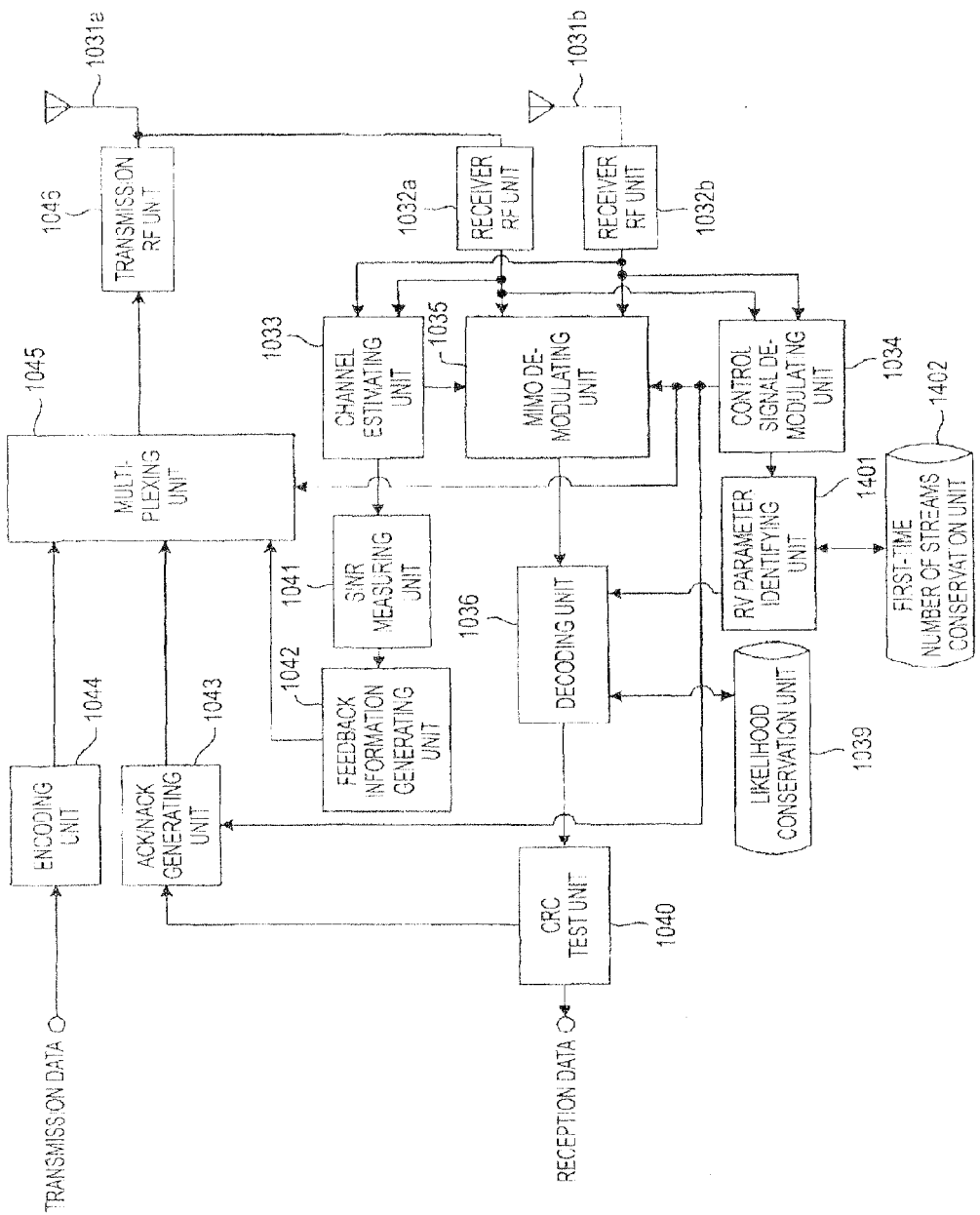
FIG. 14 is a block diagram representing the configuration of the major part of a receiver apparatus used in the third embodiment of the present invention.
Figure 15:
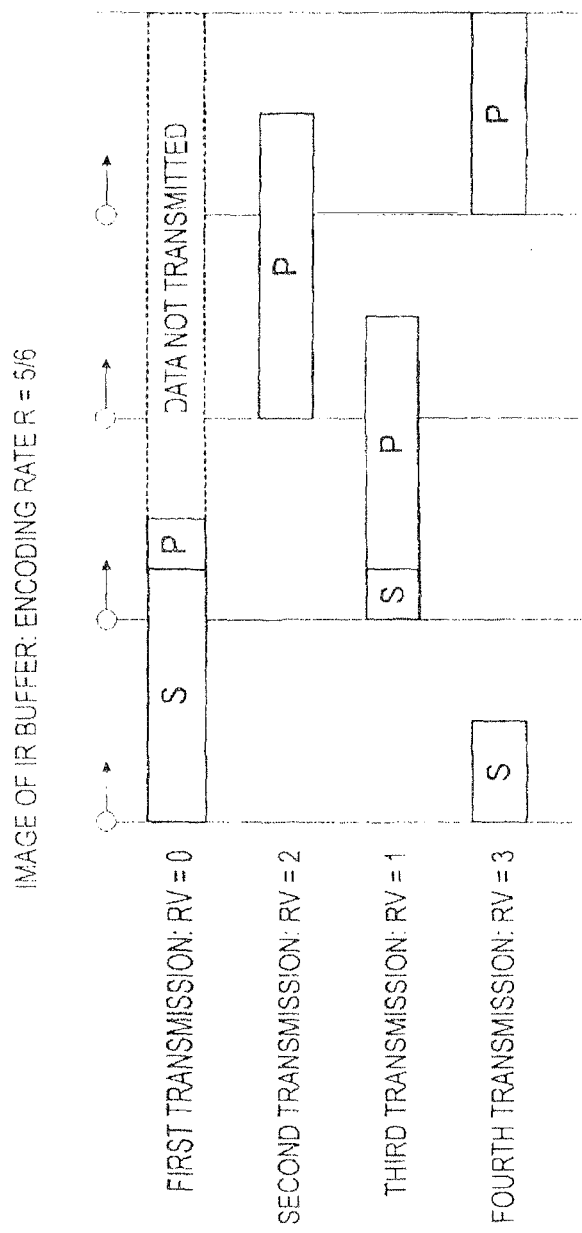
FIG. 15 is a diagram representing a concrete example of the relationship between transmission data and RV parameter settings in retransmission control.
Figure 16:
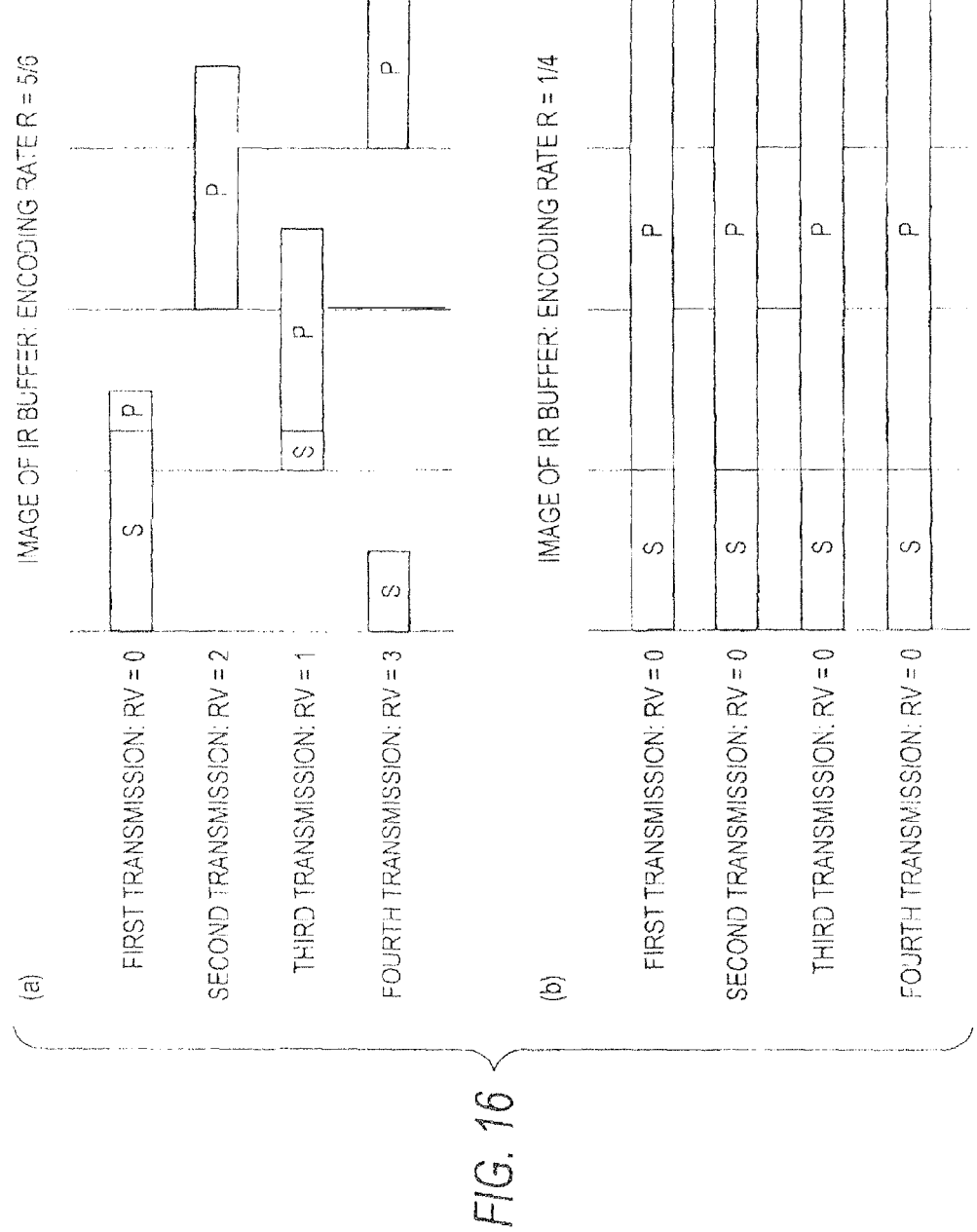
FIG. 16 is diagram representing a concrete example of the relationship between transmission data and RV parameter setting in the retransmission control in a case where the encoding rate is changed.

FIG. 13 is a block diagram representing the configuration of the major part of the transmission apparatus used in the third embodiment of the present invention. FIG. 14 is a block diagram representing the configuration of the major part of the receiver apparatus used in the third embodiment of the present invention.

The third embodiment is an example acquired by modifying a part of the second embodiment. In the third embodiment, to a same element as that of the second embodiment, a same reference sign is assigned, and detailed description thereof is omitted.

In the transmission device shown in FIG. 13, the operations of the scheduling unit 1301, the inter-code word RV parameter bit-number adjusting unit 1302, and the RV parameter bit-number conservation unit 1303 for each code word are different from those of the configuration shown in FIG. 9. The configuration in which the number of bits of the RV parameter is set in accordance with the number of streams of the first transmission is used. Here, the operation of setting the RV parameter in a plurality of code words, which is one of characteristic operations of the transmission apparatus of this embodiment, will be described in detail.

When the numbers of bits of the RV parameters for the plurality of code words are set, the inter-code word RV parameter bit-number setting unit 1302 sets the number of bits of the RV parameter for each code word such that the number of bits of the RV parameter becomes smaller as the code word has a relatively smaller number of streams by referring to the number of streams of the first transmission for each code word, while maintaining a total number of the bits of the RV parameters to be constant. Then, the inter-code word RV parameter bit-number setting unit 1302 outputs the set value of the number of bits of the RV parameter for each code word to the RV parameter bit-number conservation unit 1303 to be stored therein.

At the time of retransmission of each code word, the scheduling unit 1301 sets the RV parameter for the corresponding code word by referring to the number of bits of the RV parameter that is stored in the RV parameter bit-number conservation unit 1303 for each code word. In addition, the inter-code word RV parameter bit-number adjusting unit 1302 may set the RV parameter for each code word. The control signal generating unit 914 generates a control signal including the RV parameter information with the number of bits directed by the inter-code word RV parameter bit-number adjusting unit 1302 being used as the base, based on the RV parameter received from the scheduling unit 1301 through the inter-code word RV parameter bit-number adjusting unit 1302.

In a case where a retransmission occurs in a code word having a small number of streams, the scheduling unit 1301 sets the number of streams in the transmission parameter such that the number of streams is increased as the number of retransmissions increases. Accordingly, similarly to the example shown in FIG. 12, in a code word having a small number of streams of the first transmission, even when the bits of the RV parameter are small, by increasing the number of streams at the time of retransmission while maintaining the modulation type and the encoding rate to be the same, a large amount of data that has not been transmitted can be transmitted.

In the receiver apparatus shown in FIG. 14, compared to the configuration represented in FIG. 10, the operation of the RV parameter identifying unit 1401 is different, a first-time stream-number conservation unit 1402 is arranged, and the number of bits of the RV parameter and the RV parameter are configured to be identified in accordance with the number of streams of the first transmission. Here, the operation of identifying the RV parameters of a plurality of code words, which is one of characteristic operations of the receiver apparatus according to this embodiment, will be described in detail.

The RV parameter identifying unit 1401, at the time of first transmission, extracts the number of streams from the transmission parameter of the first transmission of each code word that is received from the control signal demodulating unit 1034 and stores the number of streams in the first-time stream-number conservation unit 1402. Then, the RV parameter identifying unit 1401 receives the number of transmissions from the control signal demodulating unit 1034. In the case of retransmission, the RV parameter identifying unit 1401 calculates the number of bits of the RV parameter of each code word based on the number of streams of the first transmission by referring to the number of streams of the first stream that is stored in the first-time stream-number conservation unit 1402. Thereafter, the RV parameter identifying unit 1401 demodulates and identifies the RV parameter of this transmission for each code word, which is assigned to the resources of the corresponding number of bits, based on the number of bits of the RV parameter calculated as described above and outputs the RV parameter to the decoding unit 1036. Here, the RV parameter identifying unit 1401 may calculate the number of bits of the RV parameter based on the number of streams of the first transmission and conserve the information on the number of bits of the RV parameter instead of the number of streams of the first transmission in the first-time stream-number conservation unit 1402.

In addition, in the above-described setting example, an example in which the number of bits of the RV parameter is relatively determined in accordance with the rank of the number of streams among the code words is represented. However, similarly to the first embodiment, after the number of bits of the RV parameter of each code word is individually set in accordance with the number of streams, the numbers of bits of the RV parameters may be adjusted such that a total of the numbers of the bits of the RV parameters of all the code words is a predetermined number of bits.

As described above, according to the third embodiment, in the adaptive MCS control using a plurality of code words, the MCS is set in accordance with the measurement result of the propagation path quality of each code word, and the number of bits of the RV parameter of each code word for retransmission control is set in accordance with the number of streams of the first transmission. At this time, for a code word having a smaller number of streams of the first transmission, the number of bits of the RV parameter is set to be smaller. Accordingly, while the retransmission control can be flexibly set for a code word having a large number of streams of the first transmission, the signaling resource used for the notification of the RV parameter used for a code word that may transmit untransmitted data much more with high possibility by increasing the number of streams at the time of retransmission can be reduced. In addition, the overhead of the RV parameter signaling of a plurality of code words can be decreased. As a result, the waste of resources for controlling the retransmission can be prevented in a case where a plurality of code words is used, and accordingly, the throughput can be improved.

In addition, in the above-described embodiment, the number of bits of the RV parameter has been described to zero to two as an example. However, a case where the number of bits is greater than two may be used as below. In addition, in a case where a plurality of code words is used, examples in which there are two or three code words have been described. However, a case where the number of the code words is increased or decreased to be four, eight, or the like in accordance with the number of antennas or the number of beams may be used in a similar manner.

As described above, the wireless communication apparatus according to the present invention can be built in a mobile station apparatus (communication terminal apparatus) and a base station apparatus in a mobile communication system. Accordingly, a wireless communication mobile station apparatus, a wireless communication base station apparatus, and a mobile communication system having the above-described advantages can be provided.

The present invention is not limited to the above-described embodiments. Thus, the embodiments may be changed or applied by those skilled in the art based on the description here and known technologies, which is a plan of the present invention. Thus, such a change or application belongs to the scope of the present invention that is requested to be protected.

In each of the above-described embodiments, a case where the present invention is configured by hardware has been described as an example. However, the present invention can be implemented by software.

In addition, each functional block used in the description of each of the above-described embodiments is typically realized by an LSI as an integrated circuit. Such a block may be individually configured as one chip. In addition, a part or all of the functional blocks may be included in one chip. Here, the chip is described as an LSI. However, it may be referred to as an IC, a system LSI, a super LSI, or an ultra LSI depending on the degree of integration.

In addition, the technique of forming as an integrated circuit is not limited to the LSI. Thus, such a technique may be implemented by a dedicated circuit or a general purpose processor. An FPGA (Field Programmable Gate Array) that can be programmed after manufacture as an LSI or a reconfigurable processor in which connections of circuit cells or settings can be reconfigured may be used.

In addition, when technology of integration circuits that substitutes the LSI by progress of semiconductor technology or a derivative separate technology appear, naturally, the functional blocks may be integrated by using such technology. There is a possibility that bio technology is applied thereto.

The present application contains subject matter related to that disclosed in Japanese Patent Application 2008-062680 filed in the Japan Patent Office on Mar. 12, 2008, the entire content of which is hereby incorporated by reference.

INDUSTRIAL APPLICABILITY

The present invention has advantages in that the resources used for transmitting a parameter relating to retransmission control can be reduced, and the throughput can be improved by decreasing the overhead of retransmission control signaling. The present invention is useful as a wireless communication apparatus that can be applied to a wireless communication system such as a cellular system, and more particularly, a wireless communication apparatus, a wireless communication system, a wireless communication method, and the like that have a retransmission control function.

The invention claimed is:

1. A wireless communication apparatus comprising:
a reception processing section that receives control information, which includes a MCS (Modulation and Coding Scheme) and RV (Redundancy Value) information indicating a RV parameter, and transmission data, a start position of which the RV parameter indicates in data that is encoded;
a RV parameter determining section that determines the RV parameter that is set based on the RV information; and
a decoding section that decodes the received transmission data based on the MCS and the RV parameter,
wherein: when a number of bits of the RV information is two, the RV parameter is set to any one among 0, 1, 2 and 3; and when a number of bits of the RV information is zero, the control information includes no RV information and the RV parameter is set to 0.

2. The wireless communication apparatus according to claim 1,
wherein the number of bits is set in accordance with an encoding rate of the data.

3. The wireless communication apparatus according to claim 1,
the number of bits is smaller as an encoding rate of the data is lower.

4. The wireless communication apparatus according to claim 1,
wherein the number of bits is set to zero when an encoding rate of the data is equal to or lower than a predetermined value.

5. The wireless communication apparatus according to claim 1,
wherein: the wireless communication apparatus performs communication using a plurality of code words; and
the number of bits is set for each of the plurality of code words, and the number of bits is smaller for code word having a lower encoding rate out of the plurality of code words.

6. The wireless communication apparatus according to claim 5,
wherein a total number of bits of the RV information for the plurality of code words is constant.

7. The wireless communication apparatus according to claim 5,
wherein the number of bits of code word having an encoding rate, which is equal to or lower than a predetermined value, out of the plurality of code words is set to zero.

8. The wireless communication apparatus according to claim 1,
wherein: the wireless communication apparatus performs communication using one or a plurality of streams for each of a plurality of code words; and the number of bits is set for each of the plurality of code words, and the number of bits is smaller for code word having a smaller number of streams at a first transmission out of the plurality of code words.

9. The wireless communication apparatus according to claim 8,
wherein a total number of bits of the RV information for the plurality of code words is constant.

10. The wireless communication apparatus according to claim 8,
wherein the number of bits of code word having a number of streams at a first transmission, which is equal to or smaller than a predetermined value, out of the plurality of code words is set to zero.

11. The wireless communication apparatus according to claim 1, wherein said RV parameter setting section varies the RV parameter in accordance with a number of retransmissions of the data.

12. The wireless communication apparatus according to claim 1, wherein the RV parameter is set to 0 at a first transmission.

13. The wireless communication apparatus according to claim 1, wherein the RV parameter indicates the different start position in accordance with a value of the RV parameter.

14. The wireless communication apparatus according to claim 1, wherein the start position, which the RV parameter that is 0 indicates, is a position that is closer to a beginning of the data.

15. The wireless communication apparatus according to claim 1, wherein transmission data, the start position of which the RV parameter that is 0 indicates, has a more number of systematic bits.

16. A wireless communication method comprising:
receiving control information, which includes a MCS (Modulation and Coding Scheme) and RV (Redundancy Value) information indicating a RV parameter, and transmission data, a start position of which the RV parameter indicates in data that is encoded;
determining the RV parameter that is set based on the RV information; and
decoding the received data based on the MCS and the RV parameter,
wherein: when a number of bits of the RV information is two, the RV parameter is set to any one among 0, 1, 2 and 3; and when a number of bits of the RV information is zero, the control information includes no RV information and the RV parameter is set to 0.

* * * * *